US009651403B2

(12) United States Patent
Kim et al.

(10) Patent No.: US 9,651,403 B2
(45) Date of Patent: May 16, 2017

(54) ABSOLUTE POSITION MEASUREMENT METHOD, ABSOLUTE POSITION MEASUREMENT APPARATUS AND SCALE

(71) Applicant: Korea Research Institute of Standards and Science, Daejeon (KR)

(72) Inventors: Jong-Ahn Kim, Daejeon (KR); Jae-Wan Kim, Daejeon (KR); Tae-Bong Eom, Daejeon (KR); Chu-Shik Kang, Daejeon (KR); Jong-Han Jin, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 258 days.

(21) Appl. No.: 14/540,743

(22) Filed: Nov. 13, 2014

(65) Prior Publication Data

US 2015/0069225 A1 Mar. 12, 2015

Related U.S. Application Data

(63) Continuation of application No. PCT/KR2013/003469, filed on Apr. 23, 2013.

(30) Foreign Application Priority Data

May 15, 2012 (KR) ........................ 10-2012-0051435
Oct. 15, 2012 (KR) ........................ 10-2012-0114099

(51) Int. Cl.
*G01D 5/347* (2006.01)
*G01D 5/245* (2006.01)

(52) U.S. Cl.
CPC ....... *G01D 5/34707* (2013.01); *G01D 5/2455* (2013.01); *G01D 5/34746* (2013.01); *G01D 5/34776* (2013.01); *G01D 5/34792* (2013.01)

(58) Field of Classification Search
CPC ........... G01D 5/34746; G01D 5/34776; G01D 5/34792; G01D 5/244; G01D 5/25; G05B 2219/33329
See application file for complete search history.

(56) References Cited

U.S. PATENT DOCUMENTS 4,484,816 A 11/1984 Ohtomo et al.
4,947,166 A * 8/1990 Wingate ............... G01D 5/2497 341/13

(Continued)

FOREIGN PATENT DOCUMENTS

JP 3 241 894 B2 12/2001
JP 2002188942 A * 7/2002

(Continued)

OTHER PUBLICATIONS

International Search Report for Application No. PCT/KR2013/003469 dated Oct. 31, 2013.

*Primary Examiner* — Francis M Legasse, Jr.
(74) *Attorney, Agent, or Firm* — Jenkins, Wilson, Taylor & Hunt, P.A.

(57) ABSTRACT

Provided are an absolute position measurement method, an absolute position measurement apparatus, and a scale. The scale includes a scale pattern formed by replacing repeatedly arranged pseudo-random-codes with a sequence of a linear feedback shift register of N stages using a first symbol with first width representing a first state and a second symbol with second width representing a second state. The first is divided into two or more first symbol areas of different structures, and the second symbol is divided into two or more second symbol areas of different structures. There is at least one overlap area in which the first symbol and the second symbol overlap each other to have the same structure.

29 Claims, 24 Drawing Sheets

(56) References Cited

U.S. PATENT DOCUMENTS

| | | | | |
|---|---|---|---|---|
| 6,603,115 | B1 | 8/2003 | Gordon-Ingram | |
| 6,937,349 | B2 | 8/2005 | Jones et al. | |
| 8,505,210 | B2 | 8/2013 | Gribble et al. | |
| 9,267,819 | B2 * | 2/2016 | Cook | G01D 5/20 |
| 2001/0003422 | A1 * | 6/2001 | Andermo | G01D 5/2495 324/207.17 |

FOREIGN PATENT DOCUMENTS

| | | | |
|---|---|---|---|
| JP | 4 463 612 | B2 | 5/2010 |
| JP | 4 714 333 | B2 | 6/2011 |
| JP | 4 846 331 | B2 | 12/2011 |
| JP | 4 885 630 | B2 | 2/2012 |
| JP | 5 294 009 | B2 | 6/2013 |
| KR | 10 2011 0088506 | A | 8/2011 |

* cited by examiner

ABSOLUTE POSITION MEASUREMENT METHOD, ABSOLUTE POSITION MEASUREMENT APPARATUS AND SCALE

CROSS-REFERENCE TO RELATED APPLICATIONS

This application is a continuation of and claims priority to PCT/KR2013/003469 filed on Apr. 23, 2013, which claims priority to Korea Patent Application No. 10-2012-0051435 filed on May 15, 2012 and Korea Patent Application No. 10-2012-0114099 filed on Oct. 15, 2012, the entireties of which are hereby incorporated by reference.

BACKGROUND

1. Technical Field

The present disclosure generally relates to absolute position measurement methods and, more particularly, methods for calculating a coarse absolute position by reading a scale pattern obtained by symbolizing a pseudo-random-code and calculating an accurate absolute position using a phase of a code.

The present disclosure also relates to methods for measuring an absolute position and, more particularly, to methods for calculating an absolute position by optically reading a binary scale using an absolute position binary code (APBC).

2. Description of the Related Art

An absolute position encoder allowing a read head to decide an absolute position using an absolute position scale is well known. The absolute position encoder includes a scale to a single track having specific position data that are successively formed along a measuring dimension of the scale. However, resolution limitation of the specific data makes it difficult for the absolute position encoder to provide an accurate position.

An incremental position encoder is an apparatus for measuring a relative position of two objects. The incremental position encoder may recognize the same patterns arranged at regular intervals to provide an accurate relative position. However, the incremental position encoder cannot provide an absolute position.

Accordingly, there is a need for a novel encoder structured to provide an absolute position and an accurate position.

In various precision systems and scientific instruments, accurate position measurements are fundamental components for monitoring and controlling actuating systems. Laser interferometers and optical encoders are typical position sensors. The laser interferometer counts and sub-divides interference fringes to measure a position with a sub-nanometer resolution. A period of the interference fringes is decided by a wavelength of a laser light source.

The optical encoder uses a scale. The scale has uniform and periodical patterns, which has uniform periodic patterns with several or tens of micrometer pitch, and obtains position readouts by processing an interference fringe or an intensity profile.

The laser interferometer can achieve higher accuracy, but requires well-controlled environmental condition and delicate alignment.

In incremental position measurement, the position readout is obtained by accumulating relative displacement from an initial position. The incremental position measurement has been applied to many applications such as precise stage and position monitoring.

However, the incremental position measurement is used to measure only relative displacement and requires initialization using an additional sensor to measure an absolute position.

The absolute position measurement improves efficiency and robustness of precision systems because it does not require initialization and can hand various emergency events without requiring initialization. The absolute position measurement is also advantageous in an application in which power consumption must be strictly controlled.

An absolute encoder requires a specially designed scale. An absolute position binary code (APBC) is encoded to the scale. In the initial stage, the APBC was encoded using a multi-track code and an incremental track is added for high resolution. However, a complex configuration and an alignment issue of an encoder head are unavoidably caused by a multi-track configuration of the scale.

Accordingly, there is a need for a novel encoder structured to provide an absolute position and an accurate position.

SUMMARY

An object of the present disclosure is to provide an absolute position encoder which is capable of knowing an absolute position.

An absolute position measuring method according to an embodiment of the present disclosure may include forming a scale pattern by replacing repeatedly arranged pseudo-random-codes with a sequence of a linear feedback shift register of N stages using a first symbol with first width representing a first state and a second symbol with second width representing a second state, wherein the first symbol is divided into two or more first symbol areas of different structures and the second symbol is divided into two or more second symbol areas of different structures, and there is at least one overlap area in which the first symbol and the second symbol overlap each other to have the same structure; and extracting at least one data relative to a minimum area among the overlap area, the first symbol areas, and the second symbol areas and extracting a sensing signal relative to measurement width equal to or greater than length of a codeword including the N stages.

In an example embodiment, the first width may be three or more times greater than width of the minimum area, the first symbol may be divided at equidistant intervals as the minimum area, and the second symbol may be divided at equidistant intervals as the minimum area. The absolute position measuring method may further include at least one of summing the sensing signals measured at intervals of the first width within the range of the measurement width to extract summing signals; specifying an overlap area of the first symbol and the second symbol using the summing signals; analyzing the codeword on the basis of the overlap area to extract coarse absolute position information; and extracting a phase using the sensing signal corresponding to the overlap area to extract fine absolute position information.

In an example embodiment, the first symbol may be divided into three sections at equidistant intervals as the minimum areas, and the second symbol may be divided into three sections at equidistant intervals as the minimum area.

In an example embodiment, the pseudo-random-code may be a maximum length sequence.

In an example embodiment, there may be two or three sensing signals relative to the overlap area.

In an example embodiment, the overlap area may include two overlap areas spaced apart from each other.

In an example embodiment, the overlap area may include two overlap areas disposed successively.

In an example embodiment, the sensing signal may be an optical signal reflected from the scale.

In an example embodiment, the sensing signal may be an optical signal passing through the scale.

In an example embodiment, the first width may be between several micrometers and several millimeters.

A scale for measuring an absolute position according to an embodiment of the present disclosure may include a scale pattern formed by replacing repeatedly arranged pseudo-random-codes with a sequence of a linear feedback shift register of N stages using a first symbol with first width representing a first state and a second symbol with second width representing a second state. The first symbol may be divided into two or more first symbol areas of different structures, and the second symbol may be divided into two or more second symbol areas of different structures. There may be at least one overlap area in which the first symbol and the second symbol overlap each other to have the same structure.

In an example embodiment, the first symbol and the second symbol may include at least one bar pattern.

In an example embodiment, the pseudo-random-code may be a maximum length sequence.

In an example embodiment, the overlap area may include two overlap areas spaced apart from each other.

In an example embodiment, the overlap area may include two overlap areas disposed successively.

An absolute position measurement apparatus according to an embodiment of the present disclosure may include a scale including a scale pattern formed by replacing repeatedly arranged pseudo-random-codes with a sequence of a linear feedback shift register of N stages using a first symbol with first width representing a first state and a second symbol with second width representing a second state, wherein the first symbol is divided into two or more first symbol areas of different structures and the second symbol is divided into two or more second symbol areas of different structures, there is at least one overlap area in which the first symbol and the second symbol overlap each other to have the same structure, and at least one data is extracted relative to a minimum area among the overlap area, the first symbol areas, and the second symbol area; a sensor array adapted to measure a sensing signal relative to measurement width equal to or greater than length of a codeword including the N stages, wherein the first width is three times greater than width of the minimum area, the first symbol is divided at equidistant intervals as the minimum areas, and the second symbol is divided at equidistant intervals as the minimum areas; and a processing unit configured such that the sensing signals measured at intervals of the first width within the range of the measurement width are summed to provide summing signals.

In an example embodiment, the processing unit may specify the first symbol and the second symbol by using the summing signals, analyze the codeword on the basis of the overlap area to extract coarse absolute position information, and extract a phase by using the sensing signal corresponding to the overlap area to extract fine absolute position information.

An absolute position measurement method according to an embodiment of the present disclosure may include providing a binary scale including an absolute position binary code, wherein a data cell representing one bit of the absolute position binary code includes a data section, a neutral section, and a clock section of a relatively fixed position, each of the sections includes at least one segment, and the data cell is sub-divided into the segments at equidistant intervals; obtaining an image of the binary scale through an optical system and an optical sensor; and processing the image to calculate an absolute position. The magnification of the optical system may be adjusted such that width of an image corresponding one segment is integer multiple of pixel width of the optical sensor array.

In an example embodiment, the data section may be shifted by one segment to represent a binary state in the data cell.

In an example embodiment, processing the image to calculate an absolute position may include at least one of finding a clock pixel most closely aligned with the clock section in a pixel subset corresponding to one data cell width; assigning an order of the clock pixel to a clock pixel index in the pixel subset corresponding to one data cell width; circularly shifting the clock pixel index in a direction of reducing the clock pixel index to obtain an absolute code pixel index; deciding a binary state of a pixel subset using the intensities of absolute code pixels corresponding to the absolute code pixel index in each pixel subset; converting a binary code of pixel subsets whose binary state is decided into an absolute position code through a lookup table; finding a data pixel corresponding to a position of the data section with the maximum intensity in each pixel subset; calculating a relative phase of the data section by using pixel values around the data pixel; subtracting $-2\pi$ when the relative phase is equal to or greater than zero; and calculating the absolute position by using the absolute position code, the absolute code pixel index, and the relative phase.

In an example embodiment, the absolute position measurement method may further include eliminating a length-dependent error term by using a linear feedback manner; and compensating a nonlinearity error in a sub-division process with a sinusoidal function according to the relative phase.

In an example embodiment, the data cell may represent one bit of a first absolute position binary code of a first direction and one bit of a second absolute position binary code of a second direction perpendicular to the first direction.

An absolute position measurement apparatus according to an embodiment of the present disclosure may include a binary scale including an absolute position binary code, wherein a data cell representing one bit of the absolute position binary code includes a data section, a neutral section, and a clock section of a relatively fixed position, each of the sections includes at least one segment, and the data cell is sub-divided into the segments at equidistant intervals; a light source adapted to irradiate light to the binary scale; an optical system adapted to focus light passing through the binary scale or reflected from the binary scale; and an optical sensor array adapted to sense an image of the binary scale. The magnification of the optical system may be adjusted such that width of an image corresponding one segment is integer multiple of pixel width of the optical sensor array.

In an example embodiment, the optical system may include an objective lens unit adapted to irradiate output light of the light source to the binary scale; and an image lens unit adapted to focus light reflected from the binary scale and passing through the objective lens unit on the optical sensor array.

In an example embodiment, the absolute position measurement apparatus may further include a collimator lens adapted to convert the light of the light source into parallel light; and a beam splitter adapted to change and provide an optical path of the parallel light to the objective lens unit and provide light provided from the objective lens unit to the image lens unit.

A binary scale including an absolute position binary code according to an embodiment of the present disclosure is provided. A data cell representing one bit of the absolute position binary code includes a data section, a neutral section, and a clock section of a relatively fixed position, each of the sections includes at least one segment, and the data cell is sub-divided into the segments at equidistant intervals.

In an example embodiment, the data section may be translated to represent a binary state in the data cell.

A two-dimensional binary scale according to an embodiment of the present disclosure is provided. A two-dimensional data cell representing one bit of a first absolute position binary code of a first direction and one bit of a second absolute position binary code of a second direction perpendicular to the first direction may include a first data section, a first neutral section, and a first clock section of a relatively fixed position in the first direction, each section including at least one segment and the two-dimensional data cell being sub-divided into the segments at equidistant intervals. The two-dimensional data cell may include a second data section, a second neutral section, and a second clock section of a relatively fixed position in the second direction perpendicular to the first direction, each section including at least one segment and the two-dimensional data cell being sub-divided into the segments at equidistant intervals. The two-dimensional data cell may represent a (0,0) state when a mark pattern is formed to fill an intersection area of the first data section and the second data section. The two-dimensional data cell may represent a (1,0) state when it is shifted in the first direction by width of the first neutral area to form the mark pattern. The two-dimensional data cell may represent a (0,1) state when it is shifted in the second direction by width of the second neutral area to form the mark pattern. The two-dimensional data cell may represent a (1,1) state when it is shifted in the second direction by the width of the first neutral area and shifted in the second direction by the width of the second neutral area to form the mark pattern. The two-dimensional data cells may be two-dimensionally arranged to form a two-dimensional absolute position scale.

A two-dimensional binary scale is provided. A two-dimensional data cell representing one bit of a first absolute position binary code of a first direction and one bit of a second absolute position binary code of a second direction perpendicular to the first direction may include a first data section, a first neutral section, and a first clock section of a relatively fixed position in the first direction, each section including at least one segment and the two-dimensional data cell being sub-divided into the segments at equidistant intervals. The two-dimensional data cell may include a second data section, a second neutral section, and a second clock section of a relatively fixed position in the second direction perpendicular to the first direction, each section including at least one segment and the two-dimensional data cell being sub-divided into the segments at equidistant intervals. The two-dimensional data cell may represent a (0,0) state when a first mark pattern is formed to fill an intersection area of the first data section and the second data section. The two-dimensional data cell may represent a (1,0) state when the first mark pattern extends in the first direction by width of the first neutral area to form a second mark pattern. The two-dimensional data cell may represent a (0,1) state when the first mark pattern extends in the second direction by width of the second neutral area to form a third mark pattern. The two-dimensional data cell may represent a (1,1) state when the first mark pattern extends in the first direction by the width of the first neutral area and extends in the second direction by the width of the second neutral area to form a fourth mark pattern. The two-dimensional data cells may be two-dimensionally arranged to form a two-dimensional absolute position scale.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
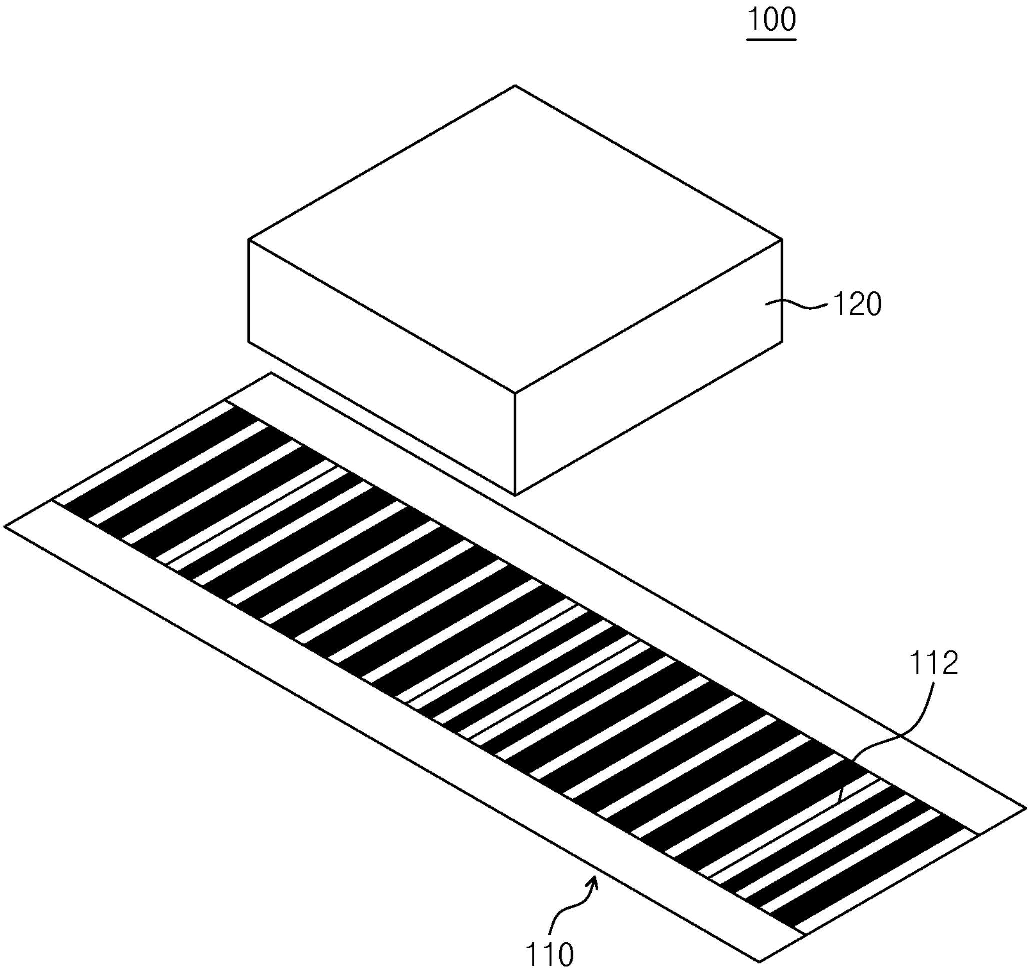
FIG. 1 illustrates a position measurement apparatus according to an embodiment of the present disclosure.

FIG. 1 illustrates a position measurement apparatus according to an embodiment of the present disclosure.

Figure 2:
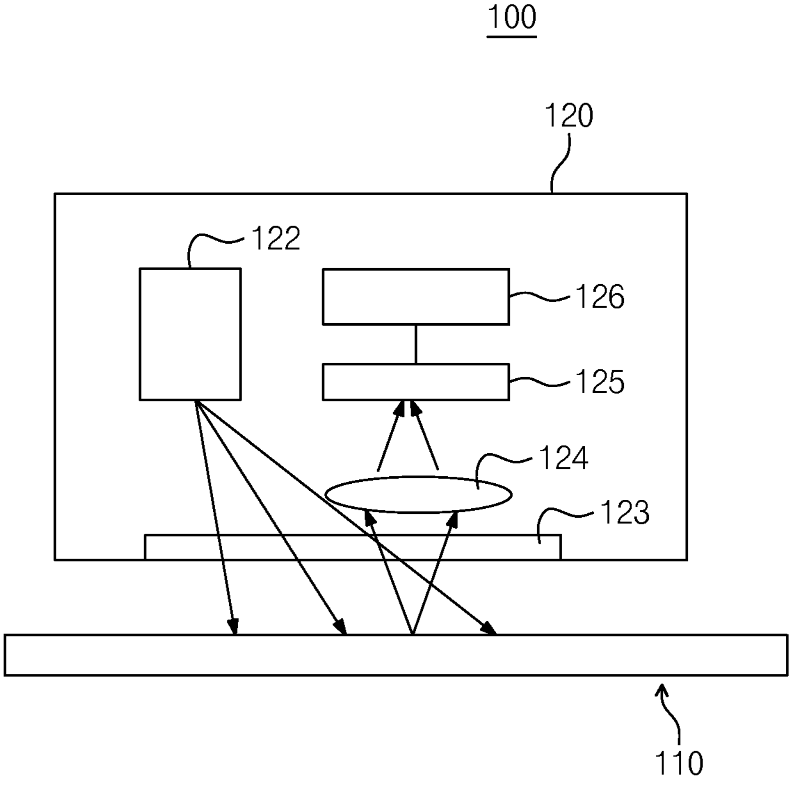
FIG. 2 is a cross-sectional view of the position measurement apparatus in FIG. 1.

FIG. 2 is a cross-sectional view of the position measurement apparatus in FIG. 1.

Referring to FIGS. 1 and 2, a position measurement apparatus 100 may include a scale 110 where a scale pattern 112 is formed and a sensing part 120 to extract absolute position information stored in the scale pattern 112.

The sensing part 120 may be a transmissive or reflective sensing part. The sensing part 120 includes a light source 122, a lens 124 to focus light reflected from the scale pattern 112, a sensor array 125 to sense the focused light, and a processing unit 126 to process data of the sensor array 125. Output light of the light source 122 may be provided to the scale pattern 112 through a transparent window 123. The scale pattern 112 will be described below in detail.

According to a modified embodiment of the present disclosure, the scale pattern 112 may be magnetically recorded. Thus, the sensing part 120 may include a magnetic sensor array.

Figure 3:
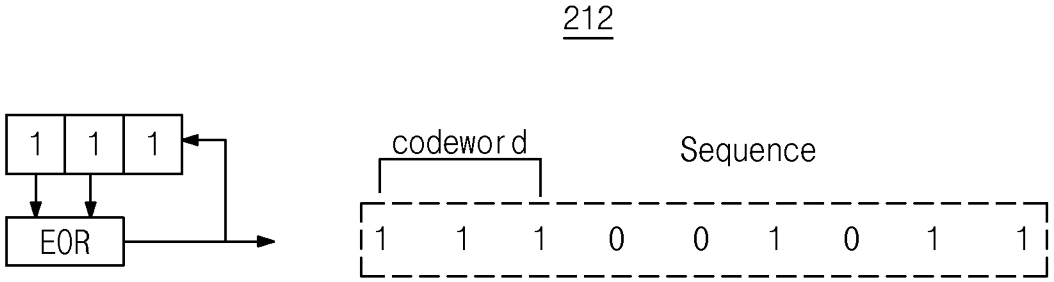
FIG. 3 illustrates a pseudo-random-code according to an embodiment of the present disclosure.

FIG. 3 illustrates a pseudo-random-code according to an embodiment of the present disclosure.

Referring to FIG. 3, a pseudo-random-code is generated using a shift register 212. A maximum length sequence is a sequence having a maximum length period among sequences that may be generated using shift registers of given N stages. For example, in case of three stages, maximum code length is 7 and a period of a maximum length sequence is 9. In case of four stages, maximum code length is 15 and a period of a maximum length sequence is 18. In case of twelve stages, maximum code length is 4095 and a period of a maximum length sequence is 4106. An absolute position corresponding to maximum code length may be displayed.

For example, in case of three stages, a maximum length sequence may be "111001011". In case of four stages, a maximum length sequence may be "111100010011010111".

TABLE (1)

| Register Value | |
|---|---|
| Codeword | Absolute Position |
| 111 | 1 |
| 110 | 2 |
| 100 | 3 |
| 001 | 4 |
| 010 | 5 |
| 101 | 6 |
| 011 | 7 |

Values of N registers may constitute a codeword, and the codeword may indicate an absolute position.

A pseudo-random-code may be variously changed. Conventionally, a scale pattern may be formed as a maximum length sequence or a Gold sequence having ten or more stages.

For brevity of description, a pseudo-random-code generated by shift registers having three stages will be described.

Figure 4:
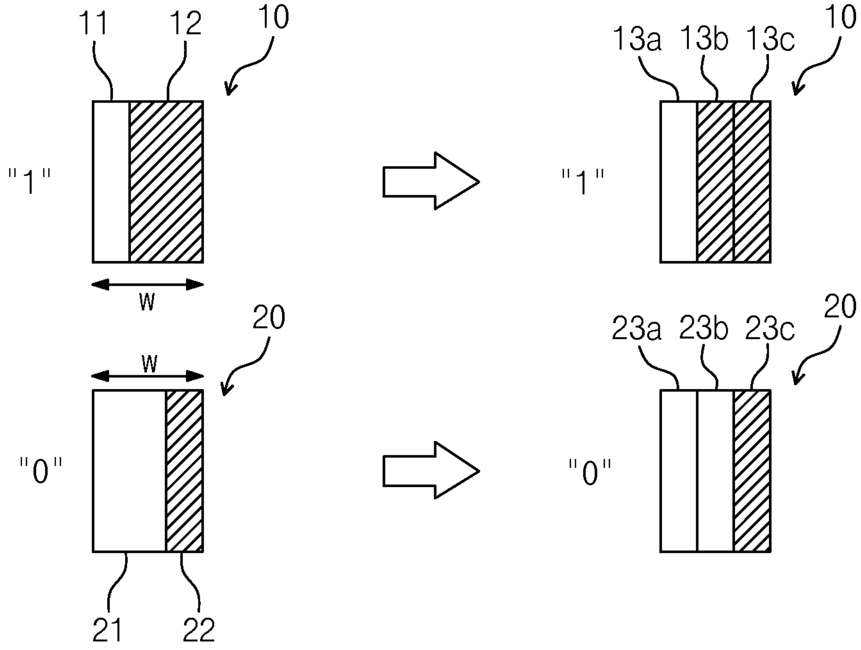
FIG. 4 illustrates a first symbol or a second symbol according to an embodiment of the present disclosure.

FIG. 4 illustrates a first symbol or a second symbol according to an embodiment of the present disclosure.

Figure 5:
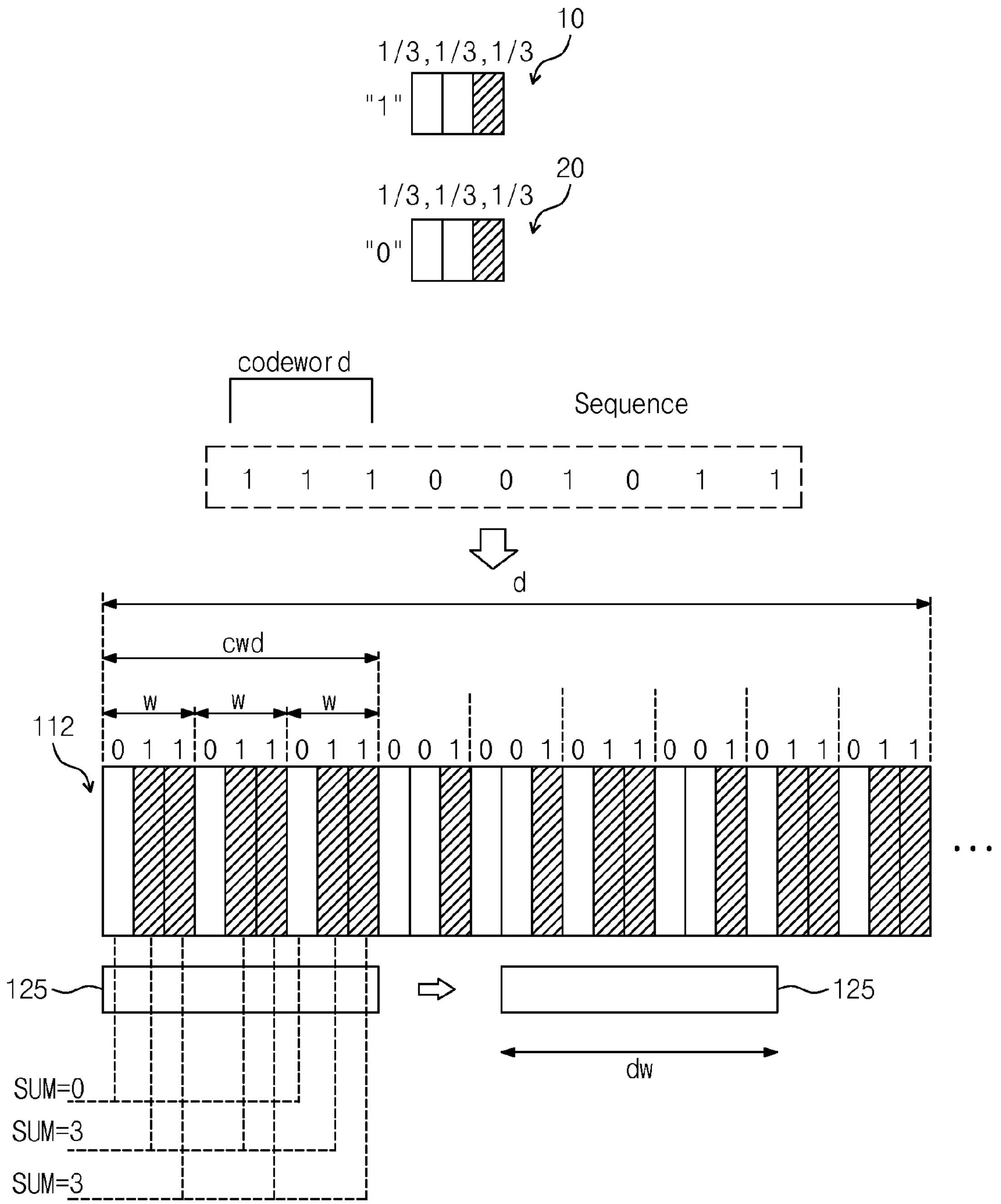
FIG. 5 illustrates a scale pattern employing the first symbol or the second symbol in FIG. 4.

FIG. 5 illustrates a scale pattern employing the first symbol or the second symbol in FIG. 4.

Referring to FIGS. 4 and 5, a pseudo-random-code needs to have a specific pattern or symbol to be applied to a scale. When the pseudo-random-code is applied to a scale pattern, a coarse absolute position may be provided. The scale pattern uses a predetermined symbol to specify an accurate position using a phase of the pseudo-random-code.

Specifically, the scale pattern 112 is formed to be replaced with a pseudo-random-code that is repeatedly disposed with a sequence of a linear feedback shift register of N stages. A value of the sequence is replaced with a first symbol 10 or a second symbol 20. Thus, reading of a scale pattern equal to or greater than length of a codeword is required to know an absolute position. The scale pattern is repeatedly disposed with unit length (d). The codeword is decided by a value of a shift register of the N stages.

The first symbol 10 has first width w and represents a first state ("HIGH"). The second symbol 20 has the first width w and represents a second state ("LOW"). The second symbol 20 has a different structure than the first symbol 10. The first width w may be between several micrometers and several millimeters.

The first symbol 10 is divided into two or more first symbol areas 11 and 12 having different structures. The second symbol 20 is divided into two or more second symbol areas 21 and 22 having different structures. When the first symbol 10 and the second symbol 20 overlap each other, they are designed such that there are one or more overlap areas 13*a*, 23*a*, 13*c*, and 23*c* having the same structure. Each of the first and second symbols 10 and 20 may be in the form of a barcode. Thus, each of the first and second symbols 10 and 20 may include at least one bar pattern.

The first symbol areas 11 and 12 are sequentially white (⅓) w and black (⅔) w. The second symbol areas 21 and 22 are sequentially white (⅔) w and black (⅓) w. Thus, the overlap areas 13*a*, 23*a*, 13*c*, and 23*c* includes first overlap areas 13*a* 23*a* and second overlap areas 13*c* and 23*c* that are spaced apart from each other. The first overlap areas 13*a* and 23*a* are white (⅓) w that appears first, and the second overlap areas 13*c* and 23*c* are black (⅓) w that appears last. Width of a minimum area is (⅓) w. If the first symbol 10 is divided into too many first symbol areas, a lot of data is required to recognize the first symbol 10. Thus, it is preferable that each of the first and second symbols 10 and 20 is divided into three sections at equidistant intervals as minimum areas.

Accordingly, the first symbol 10 includes a white minimum area 13*a*, a black minimum area 13*b*, and a black minimum area 13*c* that are successively disposed. The second symbol 20 includes a white minimum area 23*a*, a white minimum area 23*b*, and a black minimum area 23*c* that are successively disposed.

When the pseudo-random-code or sequence is replaced using the first symbol 10 and the second symbol 20, a scale pattern 112 is formed. Reading of the scale pattern 112 above the codeword is required to know an absolute position.

The scale pattern 112 may be sensed by a sensor array 125. The sensor array 125 may be disposed in a moving direction of the scale 112. Unit sensors constituting the sensor array 125 may be arranged at regular intervals in a moving direction of the scale pattern 112. The interval of the unit sensors may be integer multiple of the width of the minimum area. Thus, the sensor array 125 may obtain at least one data relative to the minimum area.

The sensor array 125 may extract at least one data relative to a smallest minimum area among the overlap area, the first symbol areas, and the second symbol areas. Measurement width dw of the sensor array 125 may correspond to length cwd of the codeword including the N stages or greater. The sensor array 125 may output a sensing signal.

The first symbol 10 and the second symbol 20 have an overlap area. Thus, the overlap area periodically appears along the scale pattern 112. Width of the first symbol 10 and width of the second symbol 20 are equal to each other and each equal to first width w. Thus, when data collected at an interval of the first width w within the measurement width dw are summed up, the overlap area may be checked.

Specifically, the first width w may be three times greater than the width of the minimum area and the first symbol 10 may be divided into three sections at equidistant intervals as the minimum areas. The second symbol 20 is divided into three sections at equidistant intervals as the minimum areas.

When single data is collected relative to the minimum areas within the range of the measurement width dw, sensing signals collected at intervals of the first width w are summed to extract summing signals. When the length of the sensor array 112 is equal to the length cwd of the codeword and a head position of the sensor array 112 matches an initial position of the scale pattern 112, the summing signals may be 0, 3, and 3. As the sensor array 125 moves right in units of the width of the minimum area, the summing signals may be expressed as follows: 0,3,3/3,3,0/3,0,2/0,2,3/2,3,0/3,0,1/0,1,3/1,3,0/3,0,1/ . . . .

Hence, a position where a value of the summing signals is 0 or 3 is a position of the overlap area. Thus, especially, 0 may be generated once relative to predetermined summing signals and 3 may be generated once or twice relative to the predetermined summing signals. When a value of the summing signal is 3, length or measurement width dw of the sensor array 125 may increase to check an overlap area on the basis of the value.

For example, the length of the sensor array 125 may be equal to the sum of the length cwd of the codeword and the first width w of integer multiple n (dw=cwd+(n×w), n being an integer equal to or greater than zero).

Thus, summing signals of the sensor array 125 having experimentally or theoretically checked predetermined length may find the overlap area.

Figure 6:
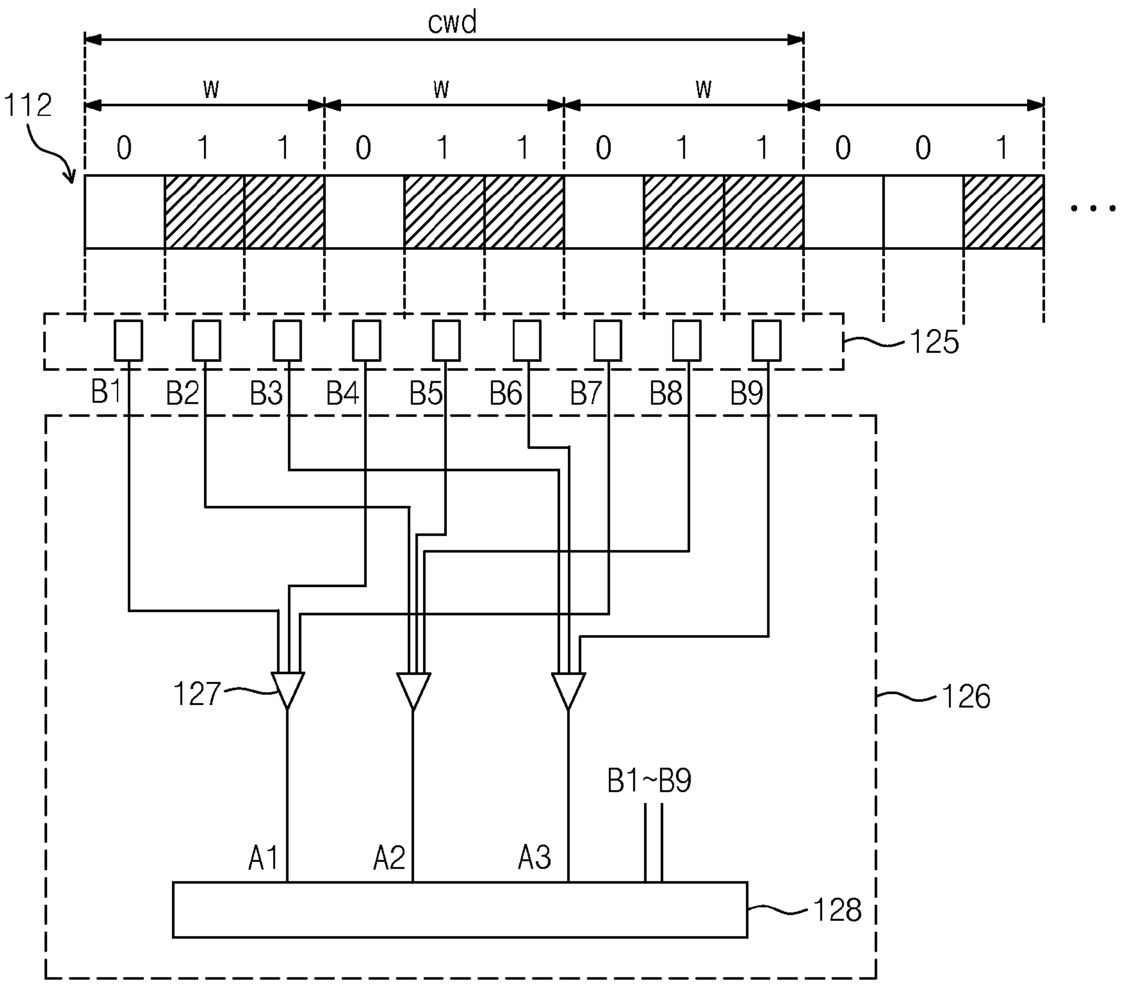
FIG. 6 is a conceptual diagram illustrating a position measurement apparatus according to an embodiment of the present disclosure.

FIG. 6 is a conceptual diagram illustrating a position measurement apparatus according to an embodiment of the present disclosure.

Figure 7:
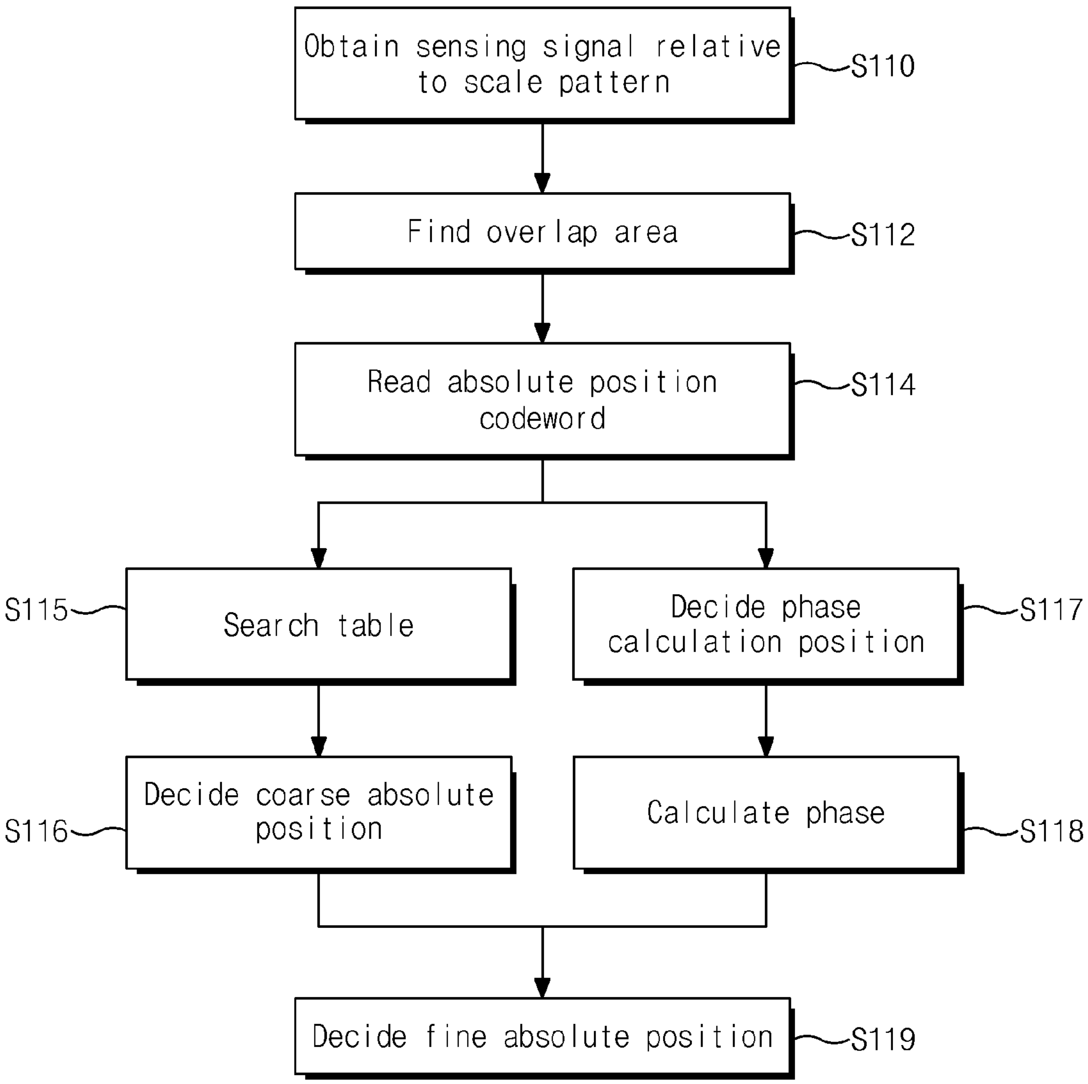
FIG. 7 is a flowchart illustrating a position measurement method according to an embodiment of the present disclosure.

FIG. 7 is a flowchart illustrating a position measurement method according to an embodiment of the present disclosure.

Referring to FIGS. 6 and 7, a single sensor is disposed relative to a single minimum area. That is, a single sensing signal is measured relative to each minimum area of a scale pattern (S110). In this case, B1 is a sensing signal corresponding to a first minimum area and B2 is a sensing signal corresponding to a second minimum area.

The first sensing signal, a fourth sensing signal, and a seventh sensing signal may be provided to a summer 127 to output a first summing signal A1. Sensing signals B1 to B9 and summing signals A1 to A3 may be provided to an auxiliary processing unit 128 to be variously operated and processed.

A summing signal is checked to find an overlap area (S112). Thus, the first summing signal A1 is the sum of the sensing signals B1, B4, and B7, the second summing signal A2 is the sum of the sensing signals B2, B5, and B8, and the third summing signal A3 is the sum of the sensing signals B3, B6, and B9. In this case, A1=0, A2=3, and A3=3. Thus, from the fact that A1=0, it will be understood that the first minimum area is the overlap area. A codeword may be known using the sensing signals B1 to B9. The codeword may provide a coarse absolute position through a table (S115 and S116).

When a position of the overlap area is known within the range of the first width, the sensing signals B1 to B9 may be interpreted as the codeword. For example, successive three symbols constitute a single codeword and the codeword is "111". Thus, the codeword may convert into the coarse absolute position as compared to a table stored in a memory. However, the coarse absolute position is low in accuracy. Accordingly, there is a need to specify an accurate position using the overlap area and measured data.

In order to calculate a phase between a sensing signal while the scale and the sensor array are aligned with each other and a sensing signal while they are not aligned with each other, predictive sensing signals of an aligned state may be generated on the basis of a read codeword. That is, a phase calculation position may be decided (S117). Thus, a phase between the predictive sensing signals and the measured sensing signals may be calculated through an algorithm (S118). The phase and the coarse absolute position may be combined with each other to provide a fine absolute position (S119). Accuracy of the fine absolute position using the phase may be one-several hundredth of the width of the minimum area.

Figure 8A:
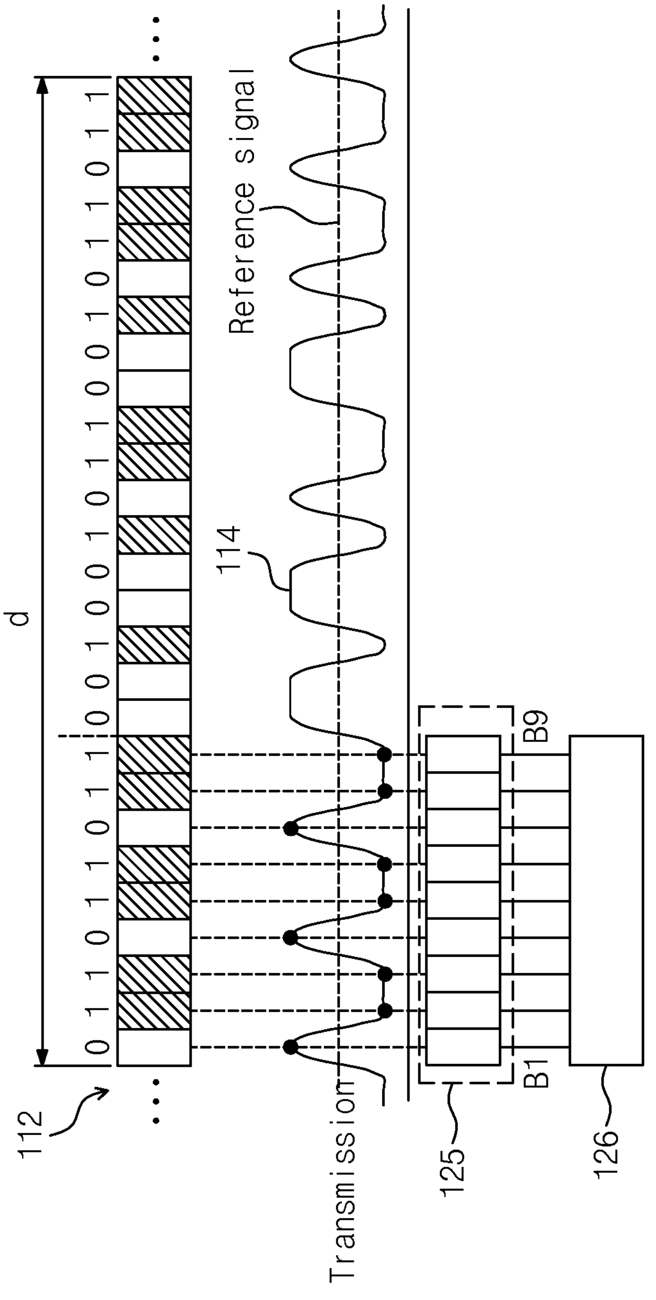
FIG. 8A illustrates a case where a sensor array is aligned with the scale pattern.

FIG. 8A illustrates a case where a sensor array is aligned with the scale pattern.

Figure 8B:
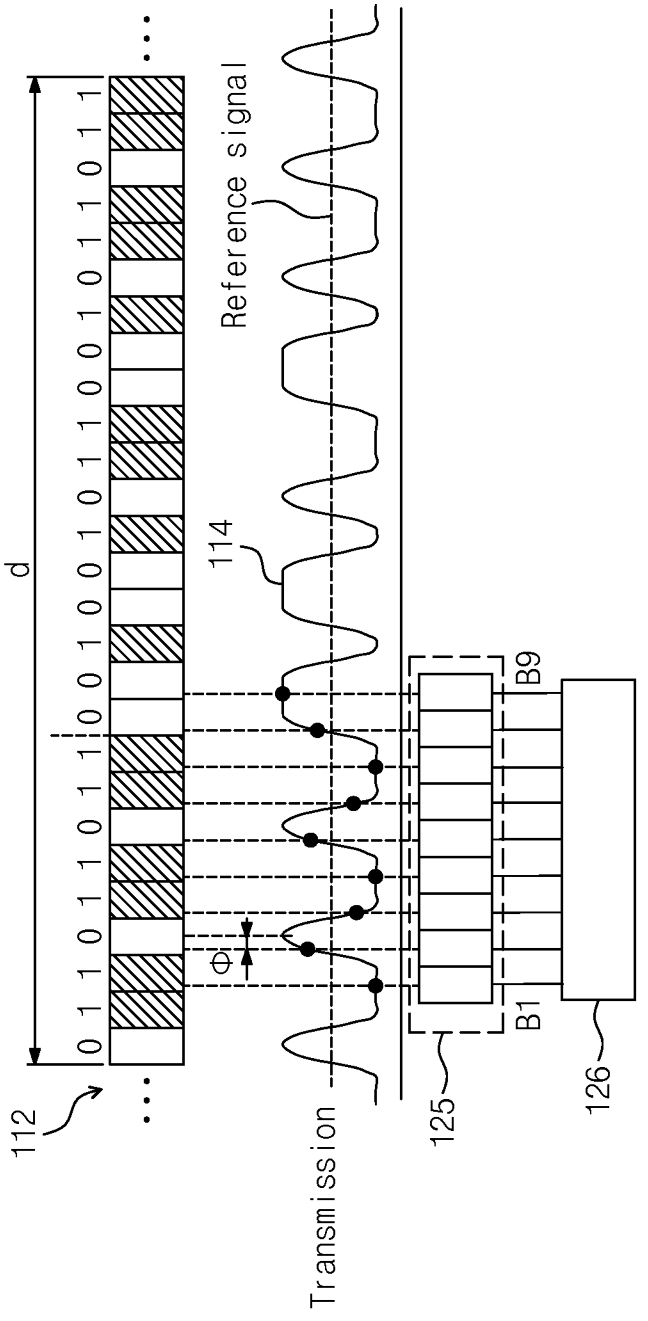
FIG. 8B illustrates a case where a sensor array is not aligned with the scale pattern.

FIG. 8B illustrates a case where a sensor array is not aligned with the scale pattern.

Referring to FIG. 8A, the scale pattern may include a transparent part ("0") and an opaque part ("1"). Measured sensing signals B1 to B9 are optical signals passing through the scale pattern. In this case, the sensing signals B1 to B9 may be fitted to a sensing signal pattern 114. The sensing signal pattern 114 may be formed to correspond to a previously known codeword by using a measured sensing signal.

Referring to FIG. 8B, a codeword may be interpreted using the measured sensing signal. When the measured sensing signal is greater than a reference signal, the sensing signal may be recognized as a LOW state. When the measured sensing signal is smaller than the reference signal, the sensing signal may be recognized as a HIGH state.

An eighth sensing signal B8 and a ninth sensing signal B9 may provide auxiliary information on the first sensing signal B1. The eighth sensing signal B8 and the ninth sensing signal B9 may provide an associated second state with reference to a second symbol. The first sensing signal B1 may provide an associated first state with reference to a structure and a sequence of the first symbol.

Measured sensing signals B1 to B9 may be fitted to a sensing signal pattern 114. For example, relative to a maximum point of the sensing signal pattern, the measured sensing signals B1 to B9 exhibit a difference according to an aligned state of the scale pattern 112. The difference represents a phase $\phi$ depending on the aligned state of the scale pattern 112 and the sensor array 125. The phase $\phi$ may provide additional relative phase information to the coarse absolute position. Thus, the phase ϕ and the coarse absolute position may be combined with each other to provide an absolute position. The phase ϕ may be calculated through a conventional phase tracking algorithm.

For a phase between a sensing signal in an aligned state and a sensing signal in a misaligned state, predictive sensing signals of an aligned state may be generated on the basis of a read codeword. That is, a phase calculation position may be decided. Thus, a phase between the predictive sensing signals and the measured sensing signals may be calculated.

Figure 9A:
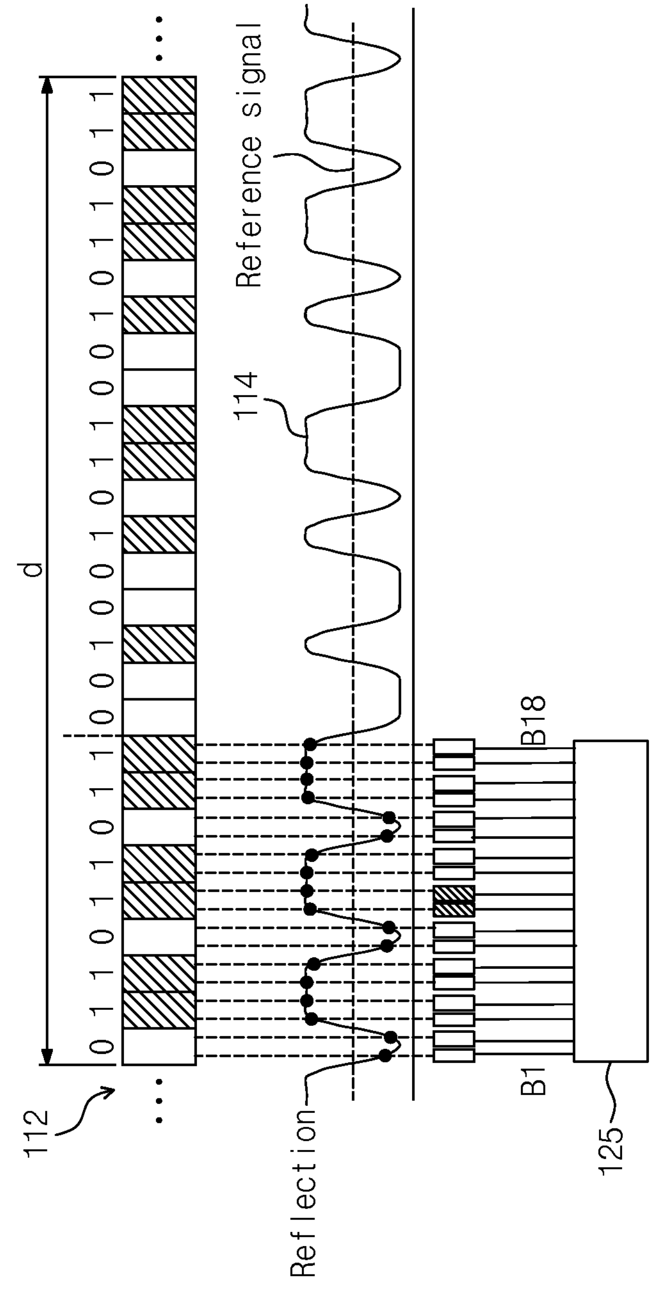
FIG. 9A illustrates a case where a sensor array is aligned with the scale pattern.

FIG. 9A illustrates a case where a sensor array is aligned with the scale pattern.

Figure 9B:
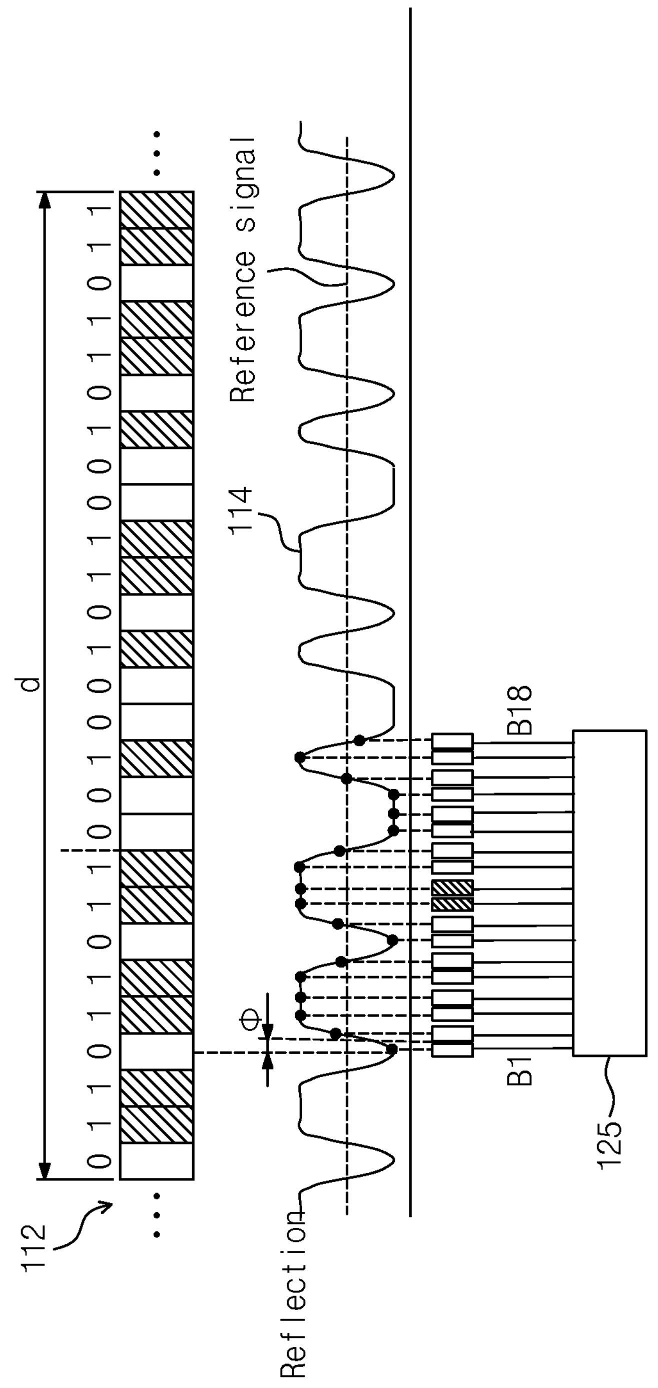
FIG. 9B illustrates a case where a sensor array is not aligned with the scale pattern.

FIG. 9B illustrates a case where a sensor array is not aligned with the scale pattern.

Referring to FIG. 9A, the scale pattern 112 may include a reflective part 0 and a transmissive part 1. Measured sensing signals B1 to B18 are optical signals reflected from the scale pattern 112. In this case, the sensing signals B1 to B18 may be fitted to a sensing signal pattern 114. The sensing signal pattern 114 may be formed to correspond to a previously known codeword using a measured sensing signal.

Referring to FIG. 9B, a summing signal may be obtained using B1, B7, and B13. If a duplicate area is checked through this, a codeword may be interpreted using a measured sensing signal. For example, when a measured sensing signal (average of B1 and B2) is smaller than a reference signal, the sensing signals B1 and B2 may be recognized as a LOW state. When a measured sensing signal (average of B3 and B4) is greater than the reference signal, the sensing signals B3 and B4 may be recognized as a HIGH state.

Measured sensing signals B1 to B18 may be fitted to a sensing signal pattern 114. For example, relative to a specific minimum point of the sensing signal pattern 114, the measured sensing signals B1 to B18 exhibit a difference according to an aligned state of the sensor array 125 and the scale pattern 112. The difference represents a phase ϕ depending on the aligned state of the sensor array 125 and the scale pattern 112. The phase ϕ may provide additional relative position information to a coarse absolute position. Thus, the phase ϕ and the coarse absolute position may be combined with each other to provide a fine absolute position. The phase ϕ may provide a phase within the range of the minimum region.

Figure 10:
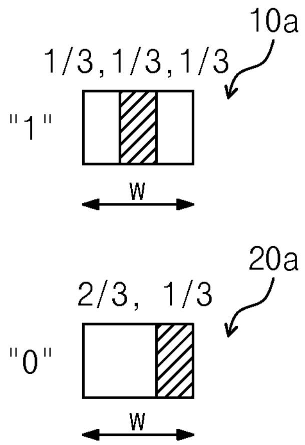
FIGS. 10 to 13 show symbols according to other embodiments of the present disclosure.

FIG. 10 shows a symbol according to another embodiment of the present disclosure.

Referring to FIG. 10, a first symbol 10*a* is divided into two or more first symbol areas of different structures, and a second symbol 20*a* is divided into two or more second symbol areas of different structures. There is at least one overlap area in which the first symbol 10*a* and the second symbol 20*a* overlap each other to have the same structure. At least one data is extracted relative to a smallest minimum area among the overlap area, the first symbol areas, and the second symbol areas, and a sensing signal is extracted relative to measurement width dw greater than length cwd of a codeword including N stages. The overlap area is provided in singularity.

The first width w is three times greater than width of the minimum area, the first symbol 10*a* is divided into three sections at equidistant intervals as the minimum areas, the second symbol 20*a* is divided into three sections at equidistant intervals as the minimum areas, and sensing signals measured at intervals of the first width are summed to extract summing signals within the range of measurement width. The first symbol 10*a* may include white (⅓) w, black (⅓) w, and white (⅓) w. The second symbol 20*a* may include white (⅔) w and black (⅓) w. However, in this case, length of a sensor array must be equal to or greater than that of a codeword to check a duplicate area.

Figure 11:
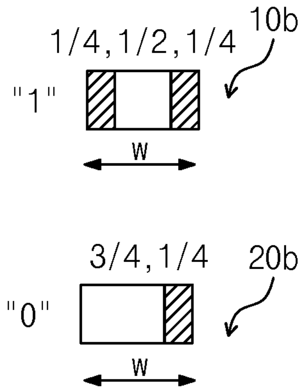

FIG. 11 shows a symbol according to another embodiment of the present disclosure.

Referring to FIG. 11, first width is four times greater than width of a minimum area, a first symbol 10*b* is divided into four sections at equidistant intervals as the minimum areas, a second symbol 20*b* is divided into four sections at equidistant intervals as the minimum areas, and sensing signals measured at intervals of the first width are summed to extract summing signals within the range of measurement width. The first symbol 10*b* may include black (¼) w, white (½) w, and black (¼) w. The second symbol 20*b* may include white (¾) w and black (¼) w. Overlap areas (black (¼) w and black (¼) w) are successively arranged mutually. However, in this case, length of a sensor array must be equal to or greater than that of a codeword to check a duplicate area.

Figure 12:
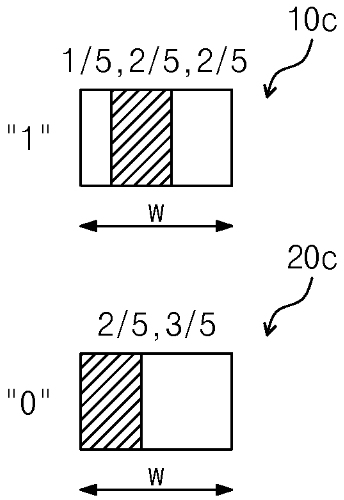

FIG. 12 shows a symbol according to another embodiment of the present disclosure.

Referring to FIG. 12, first width is five times greater than width of a minimum area, a first symbol 10*c* is divided into five sections at equidistant intervals as the minimum areas, a second symbol 20*c* is divided into five sections at equidistant intervals as the minimum areas, and sensing signals measured at intervals of the first width are summed to extract summing signals within the range of measurement width. The first symbol 10*c* may include white (⅕) w, black (⅖) w, and white (⅖) w. The second symbol 20*c* may include black (⅖) w and white (⅗) w. However, in this case, length of a sensor array must be equal to or greater than that of a codeword to check a duplicate area. Overlap areas are disposed to be spaced apart from each other.

Figure 13:
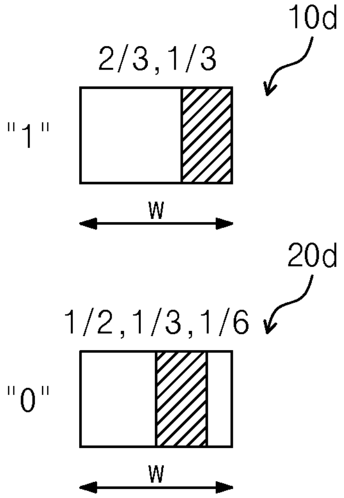

FIG. 13 shows a symbol according to another embodiment of the present disclosure.

Referring to FIG. 13, first width is six times greater than width of a minimum area, a first symbol 10*d* is divided into six sections at equidistant intervals as the minimum areas, a second symbol 20*d* is divided into six sections at equidistant intervals as the minimum areas, and sensing signals measured at intervals of the first width are summed to extract summing signals within the range of measurement width. The first symbol 10*d* may include white (⅔) w and black (⅓) w. The second symbol 20*d* may include black (½) w, black (⅓) w, and white (⅙) w. Overlap areas are disposed to be spaced apart from each other. However, in this case, length of a sensor array must be equal to or greater than that of a codeword to check a duplicate area.

Hereinafter, other embodiments of the present disclosure will now be described.

Some absolute position encoders using a single track code were developed to solve conventional drawbacks. An absolute position binary code (APBC) was encoded using the Manchester coding.

Since the absolute position encoder has no limitation in APBC expression, conventional pseudorandom binary sequences can be applied easily but an additional sensing part is required for the sub-division based on the Moiré principle.

Another absolute position encoder was proposed, which used a binary scale where the APBC was encoded by eliminating one binary state representation in an incremental scale.

However, the APBC expression is limited and a complex APBC should be newly developed to preserve the incremental information for the sub-division process.

In addition, both methods have unavoidable error sources in the sub-division process because they still depend on the subdivision algorithms used for a periodic incremental scale although the single track scales have non-periodic patterns as a result of the absolute position encoding.

In the present disclosure, a new absolute position measurement method using a single track binary code is proposed. The APBC is encoded by phase shifting the position of one binary state representation.

This absolute position encoding can express any pseudo-random binary sequences without limitation and does not interfere with the sub-division process. By analyzing the intensity profile of the scale, the decoding and the subdivision of the APBC may be performed simultaneously without additional sensing method and data acquisition.

These features enable us to implement an absolute position measurement system with a simple configuration and efficient data processing.

Hereinafter, the detailed operation principle according to other embodiments of the present disclosure will be described under a different standpoint than the foregoing.

Figure 14:
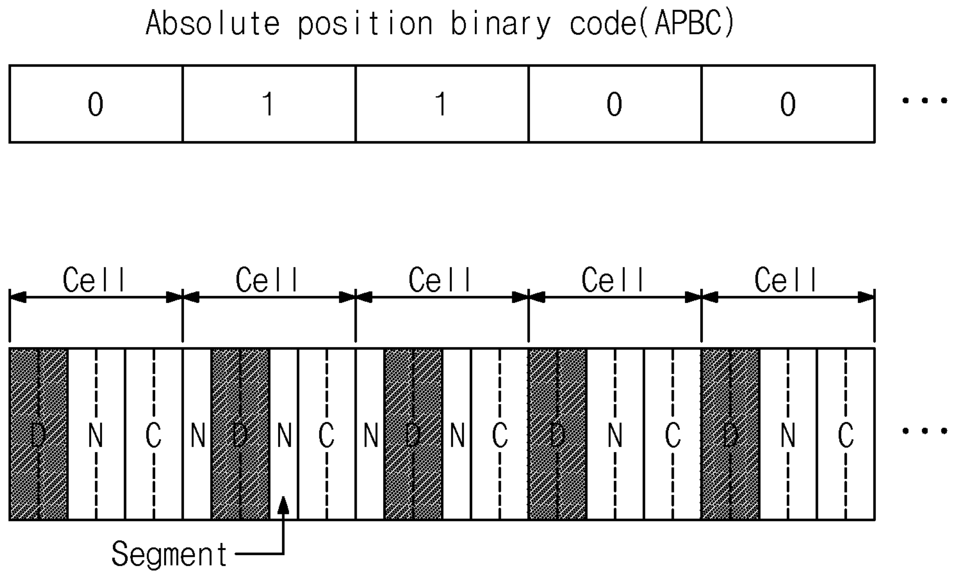
FIG. 14 illustrates binary code encoding according to an embodiment of the present disclosure.

FIG. 14 illustrates binary code encoding according to an embodiment of the present disclosure.

Single Track Binary Code

A data cell indicating one data bit of an APBC includes three sections. One data cell includes a data section (D), a clock section (C), and a neutral section (N). Each of the sections includes at least one segment. Therefore, each data cell includes three or more segments.

To represent a "0" state (first binary state), the data section and the clock section may have different binary states and the neutral section may have the same state as the clock section.

The clock sections are repeated at periodic positions and provide us with an alignment key pattern for data processing.

The position of the data section is shifted to represent the binary state of each cell in the APBC. This shift is possible outside of the clock sections and the magnitude of the shift is the integer multiple of one segment width. The neutral sections are the segments belonging to neither the data section nor the clock section.

Specifically, each data cell includes six segments and each section includes two segments. The data section is shifted by one segment to represent a "1" state (second binary state).

A sub-division of the APBC is required to obtain higher resolution. The sub-divided absolute position is calculated by detecting the positions of the data sections.

The sub-division process is executed using the acquired data for the absolute position decoding without an additional sensing part or data acquisition. A position measurement method according to the present disclosure does not eliminate the information for the sub-division to encode the APBC.

Therefore, any pseudo-random-code representing the absolute position may be applied without sacrificing accuracy in the subdivision process.

Data Acquisition

Figure 15:
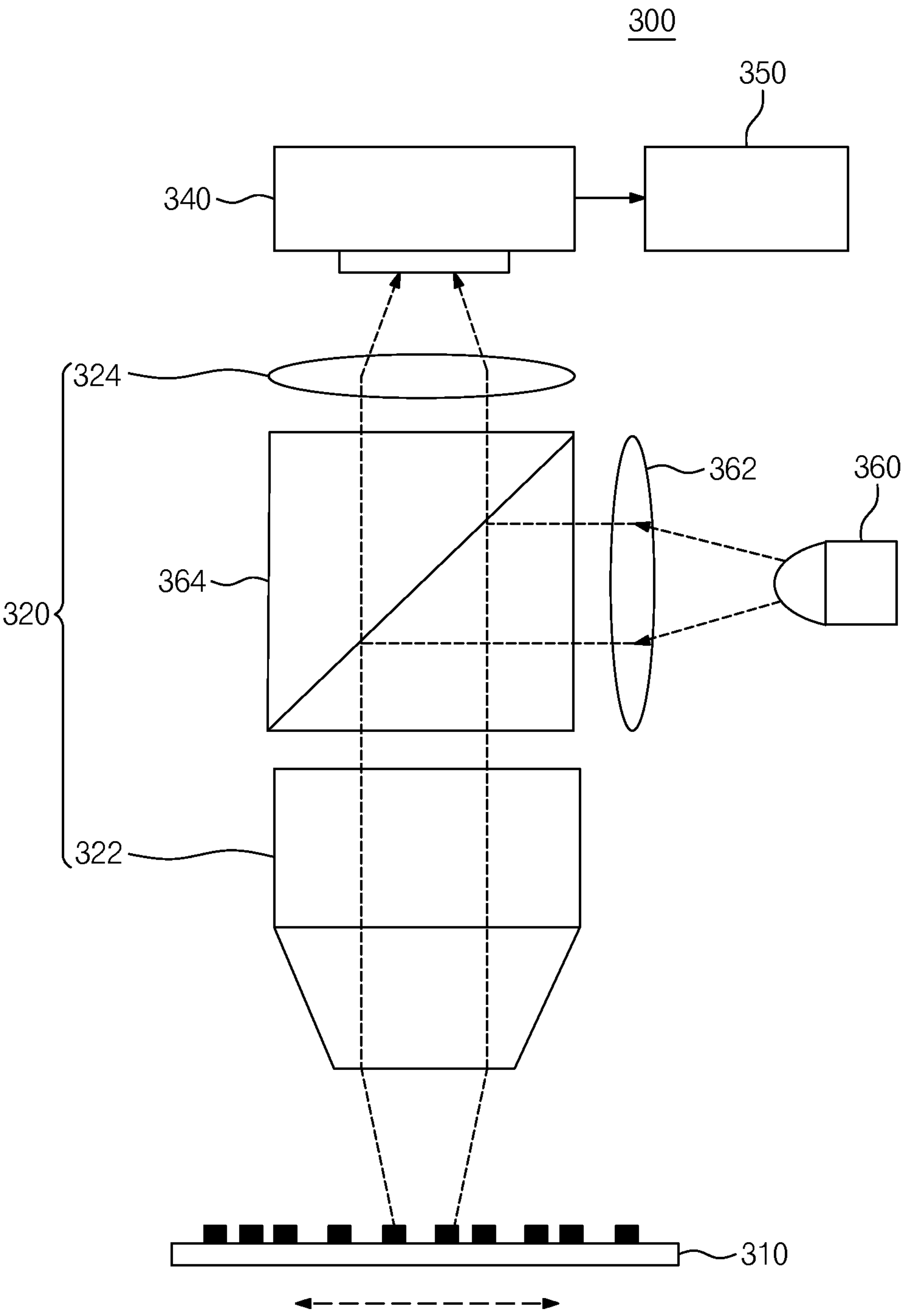
FIG. 15 illustrates an absolute position measurement apparatus according to an embodiment of the present disclosure.

FIG. 15 illustrates an absolute position measurement apparatus according to an embodiment of the present disclosure.

The measurement principle is explained by assuming that the single track binary code is made of a reflective chrome mask and the absolute position is calculated by analyzing the reflected intensity profile of the single track binary code.

Therefore, it is necessary to obtain the intensity profile adequate for data processing. An absolute position measurement system for obtaining the intensity profile may include a binary scale 310, an optical system 320, a light source 360, and a photo-sensor array 340. The optical sensor array 340 may be a CCD or a photodiode array. The optical system 320 may include an objective lens unit 322 and an imaging lens unit 324.

Light provided from the light source 360 is converted into parallel light. The parallel light is provided to a beam splitter 364 and provided to the objective lens unit 322. Light passing through the objective lens unit 322 is reflected at the binary scale 310 to be provided to the imaging lens unit 324 after passing through the beam splitter 364. Light passing through the imaging lens unit 324 provides an image of the scale 310 at the optical sensor array 340. The image obtained by optical sensor array 340 is provided to a processing unit 350 to be data-processed.

The data processing depends on structural properties of the binary code that should be maintained in the intensity profile. To decode the APBC accurately, the width of the image of one segment should match with an integer multiple of the detector pixel width of the optical sensor array 340. Thus, the magnification of the optical system 320 should be adjusted to satisfy this requirement.

For the sub-division of the APBC, the relative position of the data sections in the intensity profile should be calculated with sub-pixel resolution.

Several algorithms such as the center of gravity algorithm and the zero-crossing algorithm are widely used for peak finding. However, because they need the intensity profile fully describing the peak shape of the data section with many pixels to obtain enough accuracy, they demand much resource and calculation time for data acquisition and processing.

To obtain the relative position efficiently, a phase calculation algorithm used in phase-shifting interferometer is adopted. The phase calculation algorithm may calculate the phase of a sinusoidal intensity profile accurately with small number of equally spaced pixel data.

However, the fully-resolved image of the binary code is not a sinusoidal shape but a rectangular shape.

The FFT spectrum of the image has odd-order high harmonic terms besides the first order term representing a single frequency sinusoidal function. Therefore, an optical system with a low numerical aperture (NA) may be used to reduce the odd-order high harmonic terms and obtain the intensity profile of the data section similar to the sinusoidal function.

Data Processing

Figure 16:
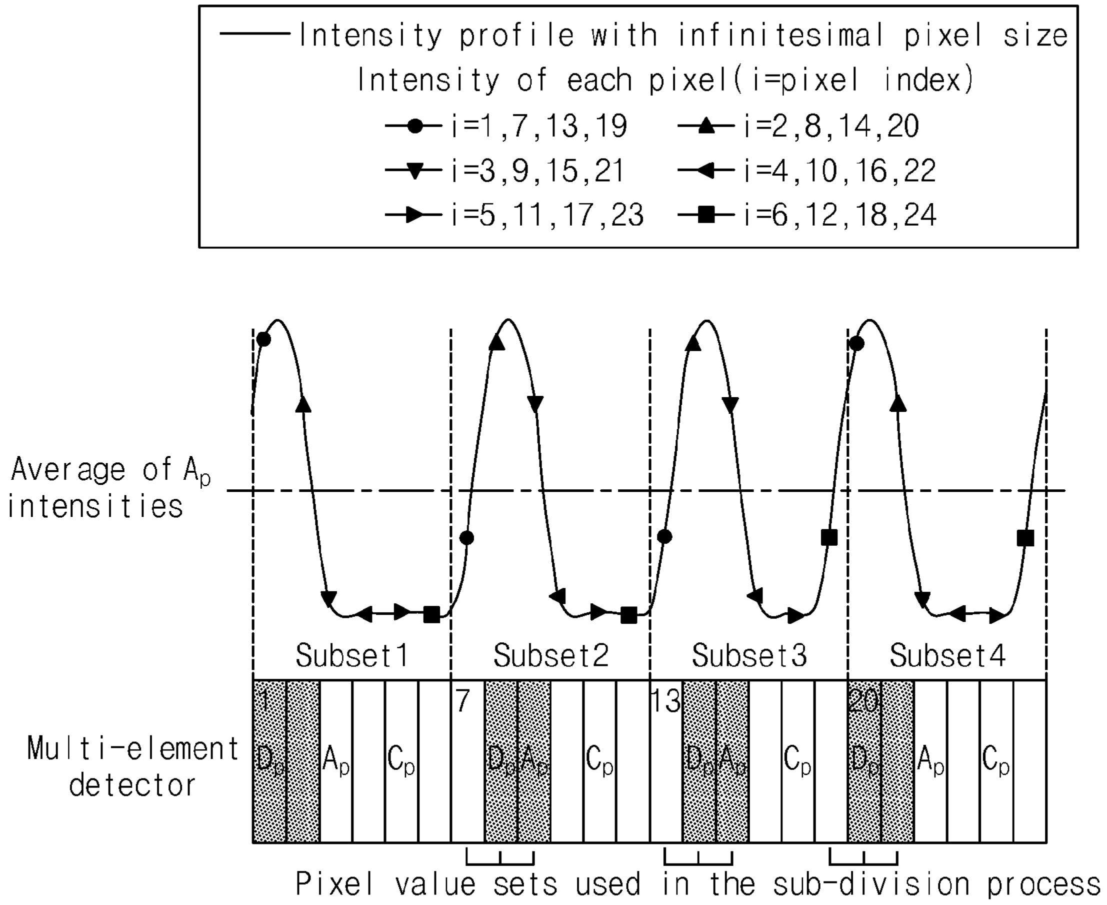
FIG. 16 shows the intensity of an ABPC on an image of an optical sensor array according to an embodiment of the present disclosure.

FIG. 16 shows the intensity of an ABPC on an image of an optical sensor array according to an embodiment of the present disclosure.

Figure 17:
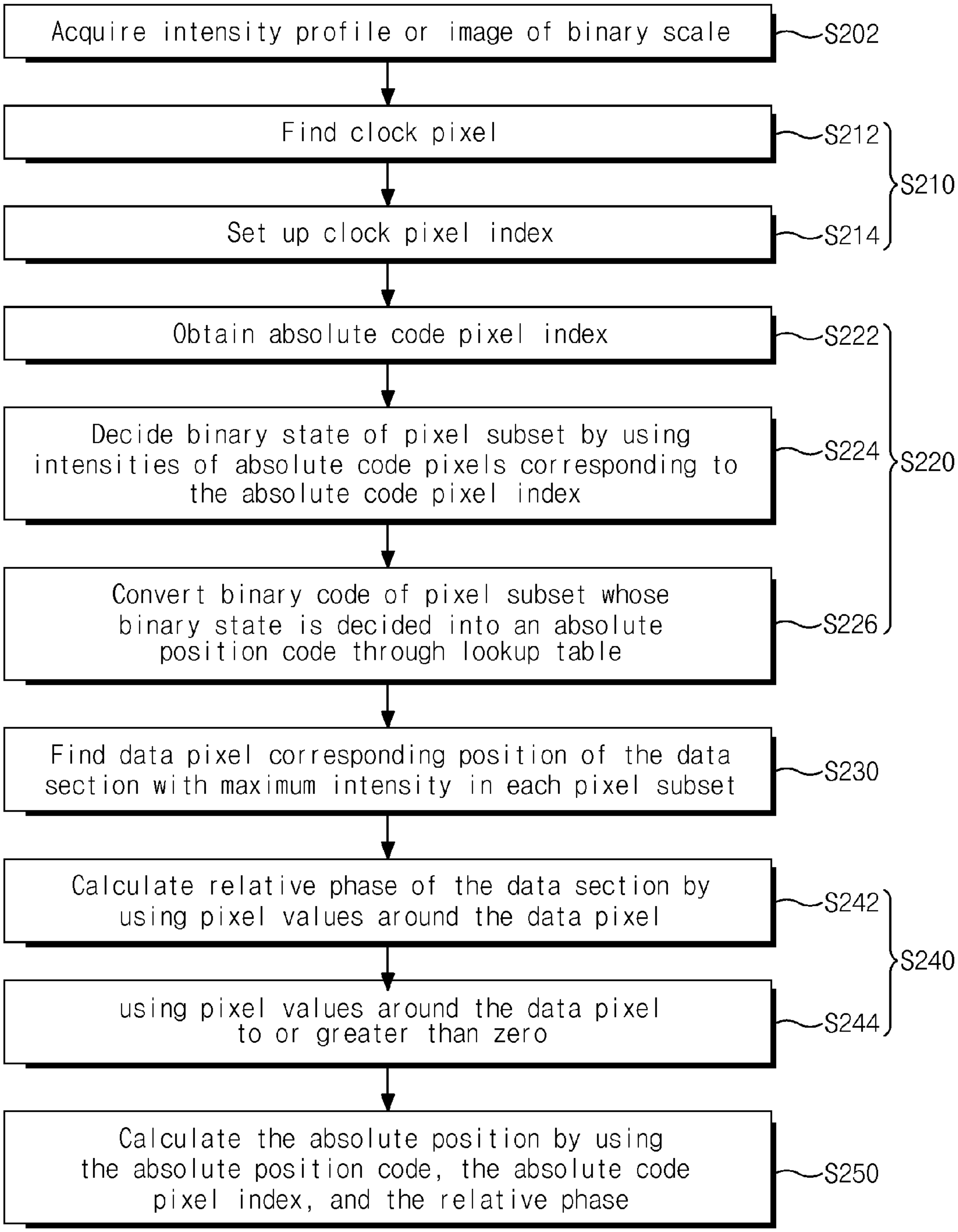
FIG. 17 is a flowchart summarizing an absolute position measurement method according to an embodiment of the present disclosure.

FIG. 17 is a flowchart summarizing an absolute position measurement method according to an embodiment of the present disclosure.

Referring to FIGS. 14, 16, and 17, the binary code configuration shown in FIG. 14 was used. Gray and white colors represent a reflective area and a non-reflective area, respectively. An n-bit linear shift feedback register (LSFR) is used to generate APBC. The APBC has 2n−1 number of combinations except for the n-bit zero-state. The magnification of the optical system 320 is adjusted such that the width of one detector pixel corresponds to that of one segment. The optical sensor array obtains the intensity profile or image of a binary scale (S202).

Therefore, the intensity profile of 6×n pixels is required for the data processing of the n-bit APBC. In the simulated intensity profile of the scale, a 4-bit binary code is slightly shifted with respect to the 24-pixel detector array about ⅕ of the pixel width for demonstrating a general situation. From this intensity profile, the absolute position with subdivided resolution can be obtained through the following procedures.

Find Clock Pixels ($C_p$) (S210)

Clock pixels ($C_p$) is found, which are most closely aligned with the clock sections (S212). The clock pixels can be detected by checking the intensity sum ($S_m$) of the pixels with a six-pixel interval.

$$S_m = \sum_{i=1}^{4} I_{6(i-1)+m} (m = 1, \ldots , 6), \quad \text{Equation (1)}$$

In the Equation (4), $I_j$ denotes the intensity of the $j^{th}$ pixel. Since the clock sections are the periodic non-reflective areas, the intensity sum of $C_{ps}$ has the minimum value. The order of $C_p$ in a pixel subset corresponding to one cell width is assigned as the clock pixel index ($C_{pi}$=1, . . . , 6) and $C_{pi}$ is 5 in the example (S214).

Find Absolute Position Code (S220)

For decoding the APBC, the absolute code pixel index ($A_{pi}$) is obtained by circularly shifting $C_{pi}$ in the direction of reducing the index by two (S122). In the example, the absolute code pixel index ($A_{pi}$) is 3.

The binary states of the subsets are decided using the intensities of the absolute code pixels ($A_p$) corresponding to $A_{pi}$ in each pixel subset (S224). If the pixel has higher intensity than the average intensity of all the absolute code pixels ($A_{ps}$), the subset is decided as the "1" state (second binary state). In the opposite case, the subset represents the "0" state (first binary state). The obtained binary code is converted into an absolute position code ($p_{LUT}$) by using a lookup table (LUT) (S226).

The sub-division of the APBC is processed in two steps. First, a relative position between the detector and the scale with the resolution of one pixel is obtained using $A_{pi}$. In the next step, the relative position of the data section is calculated with higher resolution by using a phase calculation algorithm.

Find the Data Pixels (S230)

From the absolute code pixel index ($A_{pi}$) obtained in the above step, the data pixels ($D_p$) which are rough positions of the data sections and expected to have the maximum intensity are located in each pixel subset (S230).

If the subset has the "0" state, the pixel which is two pixels ahead from $A_p$ is assigned as the data pixel $D_p$. If the subset has the "1" state, the pixel which is one pixel ahead from $A_p$ is selected as the data pixel $D_p$.

Calculate Phase (S240)

The fine relative position of the data section is calculated using pixel values around $D_p$. The intensity distribution of the three pixels around the $D_p$ may be identical to all pixel subsets, and the averages of the pixel values of the same order are used to calculate the fine relative position. Thus, an iterative calculation of the relative position of each $D_p$ may be avoided. In the example, three pixel value sets are used for the calculation except an incomplete set in the Subset 1.

Since each pixel position has π/2 phase difference in the sinusoidal intensity profile of the data section, the phase (ϕ) representing the fine relative position of the data section may be obtained using a phase calculation algorithm. The phase calculation algorithm is given by the equation below.

$$\phi = \arctan\left[\frac{(I_9 + I_{15} + I_{21}) - (I_8 + I_{14} + I_{20})}{(I_7 + I_{13} + I_{19}) - (I_8 + I_{14} + I_{20})}\right] \quad \text{Equation (2)}$$

In the Equation (2), Ii represents the $i^{th}$ pixel intensity of a sensing unit array and the phase (ϕ) has the value for between −π/2 and −π.

However, when Dp and another adjacent pixel have similar intensity values, the sum of these adjacent pixels may have a greater value than that of $D_p$s and the phase does not have a value between −π/2 and −π.

Due to the discontinuity of the arctangent function, the phase value shows abrupt change near −π. To compensate this discontinuity, −2π is subtracted from the calculated phase angle when the phase has a positive value (S244).

Calculate Absolute Position Readout (S250)

An absolute position value ($p_{abs}$) is given by the equation below.

$$p_{abs} = \left[p_{LUT} - \frac{A_{pi}}{6} + \frac{2}{3} \times \frac{\phi}{2\pi}\right] \times p \quad \text{Equation (3)}$$

The first term of the right-hand side is a decoded absolute position having a resolution of one cell. The second term represents a specific pixel, and 6 is the number of pixels per cell. The third term is a relative phase of $D_p$ in one pixel. A conversion factor is ⅔. A pitch of a sinusoidal profile of $D_p$ is four pixels, and a pitch of one cell is six pixels. The sum of the three terms is multiplied by the pitch of the data cell (p) to obtain an absolute position value ($p_{abs}$) of the same direction.

Experiment

A single track binary code scale was made of a quartz glass through a photo-mask fabrication process. The chrome pattern forms reflective areas giving a higher intensity value in the scale image. Width of one segment is 5 μm, and width of one cell is 30 μm. The binary code sequence was generated using LSFR.

A microscopic imaging system include a low NA objective lens unit having a predetermined number of openings (NA=0.07) and a predetermined magnification (M=3), a zoom lens unit, a 2D CCD camera, and an LED light source. The pixel size of the 2D CCD camera is 7.4 μm×7.4 μm.

The zoom lens unit is adjusted to fill six-pixel width with the image of one cell.

A line intensity profile was obtained by averaging a 2D image in the vertical direction.

The binary scale and a reflective mirror for the laser interferometer are fixed at the moving part of the translation stage. The interferometer provides the reference data for the performance evaluation.

A personal computer (PC) captures the 2D images of the code scale using an image grabber and takes less than 1 ms to obtain an absolute position readout by processing the captured image.

Figure 18:
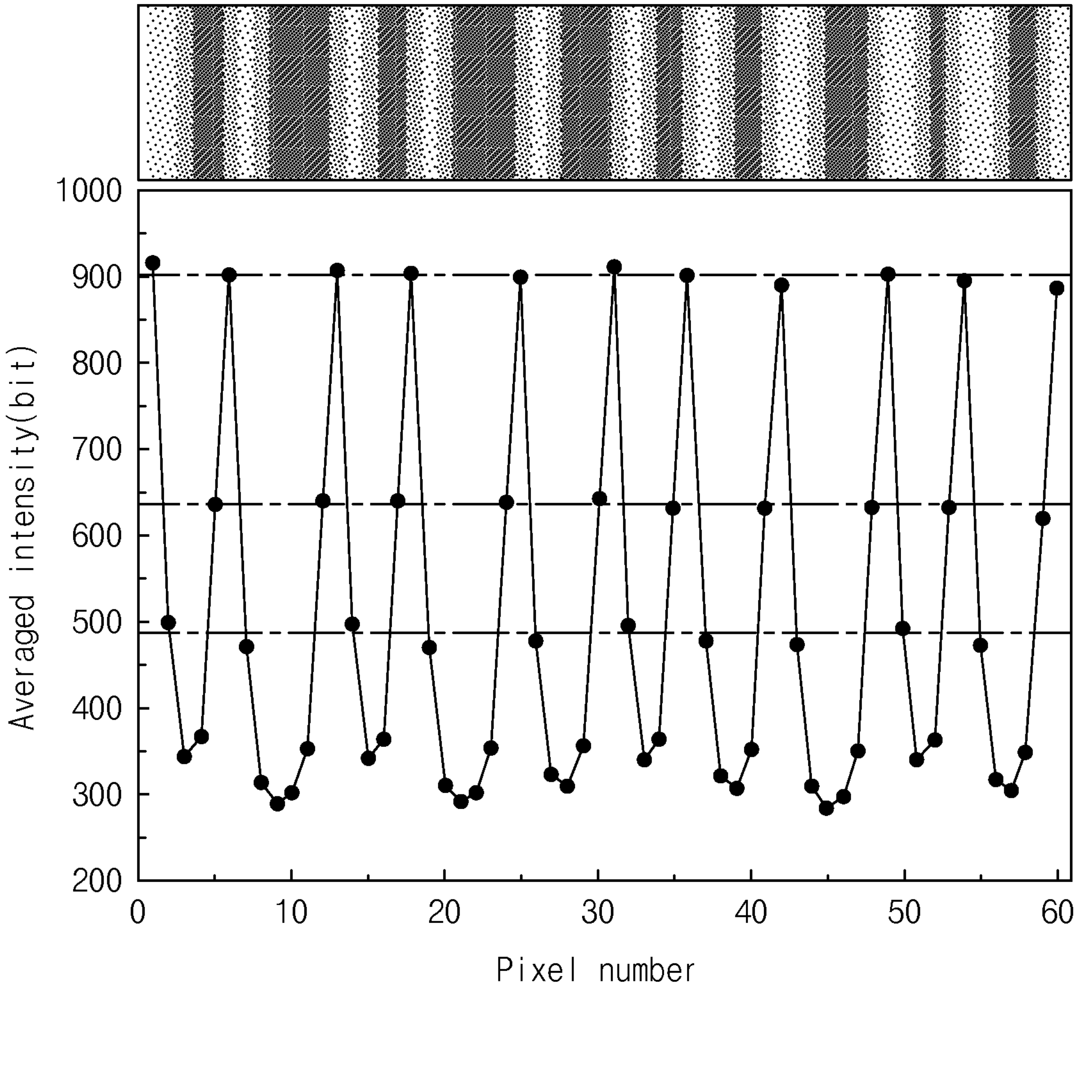
FIG. 18 shows an intensity profile of a 10-bit binary code according to an embodiment of the present disclosure.

FIG. 18 shows an intensity profile of a 10-bit binary code according to an embodiment of the present disclosure.

Figure 19:
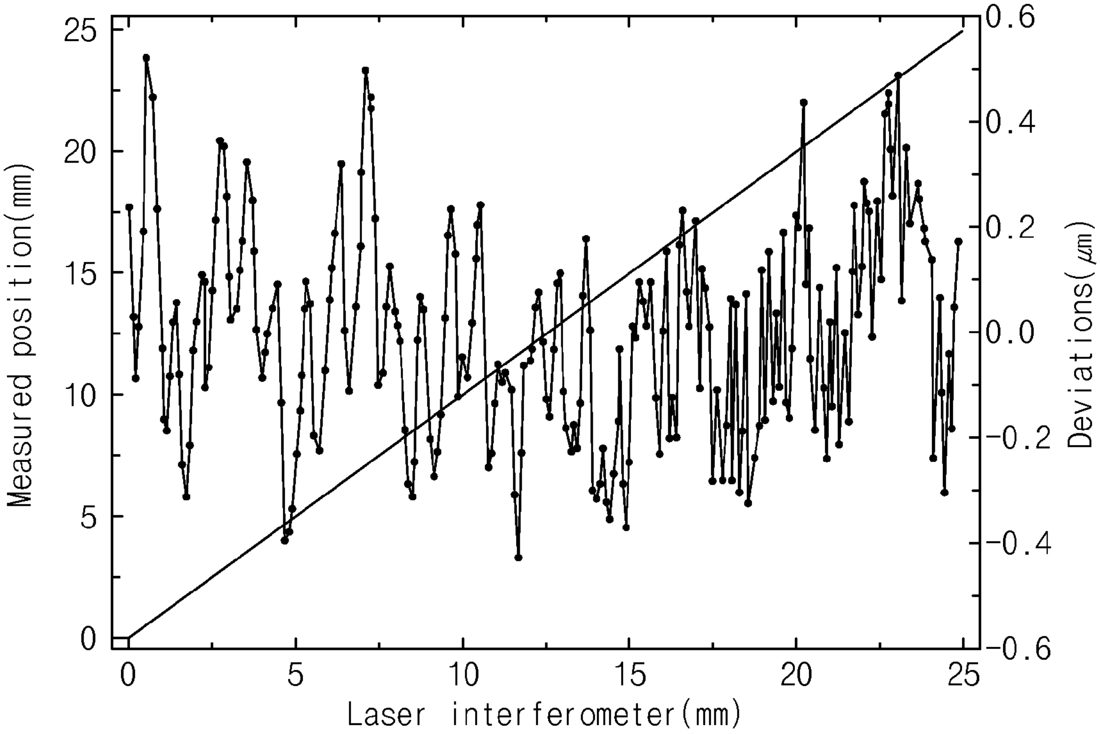
FIG. 19 shows a comparison between a result of an absolute position measurement apparatus according to an embodiment of the present disclosure and a result of a laser interferometer.

FIG. 19 shows a comparison between a result of an absolute position measurement apparatus according to an embodiment of the present disclosure and a result of a laser interferometer.

The intensity profile is obtained by averaging a partial image (60 pixels×40 pixels). The 10-bit binary code using the LSFR may express 1023 cases corresponding to over 30 mm range when the pitch of the data cell is 30 μm. The dashed lines show the averaged intensities of the pixels for the calculation of the relative phase.

The binary scale was translated within the range of 25 mm by a DC motor driven stage. The displacement was measured by the absolute position measurement system and the laser interferometer simultaneously.

The comparison results show no abnormal deviations and agree within ±0.5 μm. The deviations were calculated as residues in linear regression to eliminate the effect of the cosine error and the scale factor error.

Since the length dependent error terms were removed through the linear regression, the deviations were mostly caused by the error terms. The error terms are not proportional to the measured length such as the nonlinearity error in the binary scale and the sub-division process.

Figure 20:
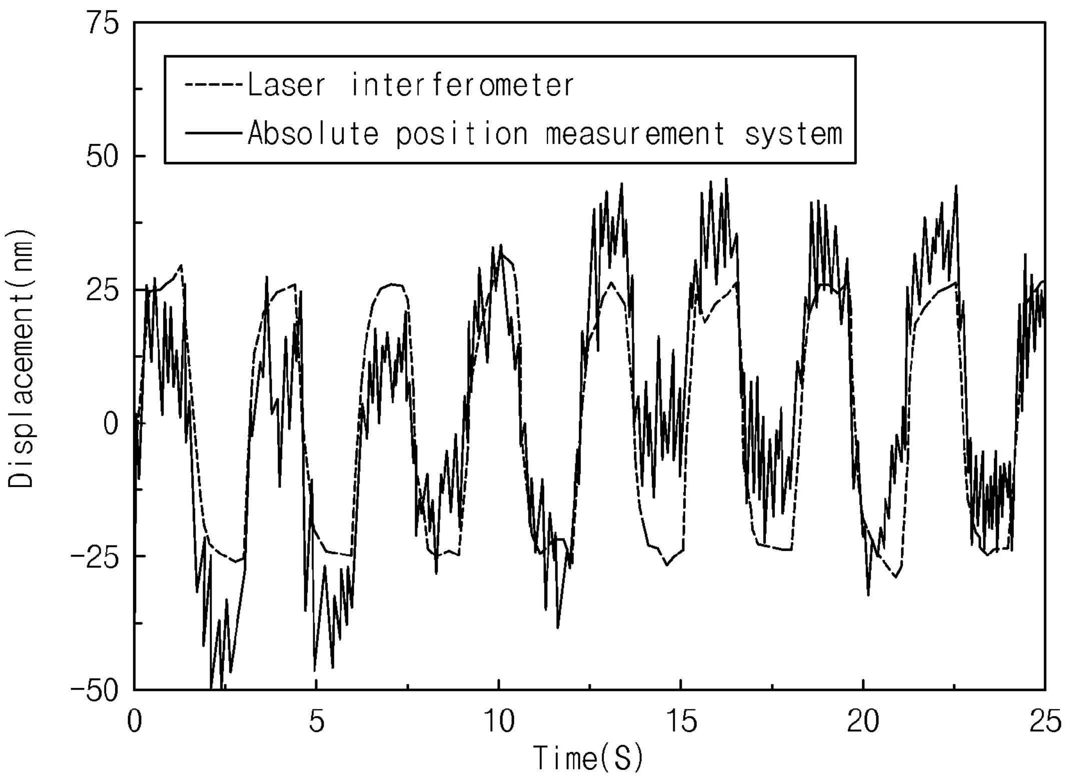
FIG. 20 shows a comparison between a measurement result of an absolute position measurement apparatus according to an embodiment of the present disclosure and a measurement result of a laser interferometer.

FIG. 20 shows a comparison between a measurement result of an absolute position measurement apparatus according to an embodiment of the present disclosure and a measurement result of a laser interferometer.

To evaluate the resolution in the absolute position measurement, the binary scale was repeatedly translated back and forth by 50 nm using a lead zirconate titanate (PZT) actuator. The stepwise displacement of 50 nm was measurable, and repeatability was 15 nm or less. In the sub-division process, the nonlinearity error was obtained as a derivation from the readout of the laser interferometer.

Figure 21:
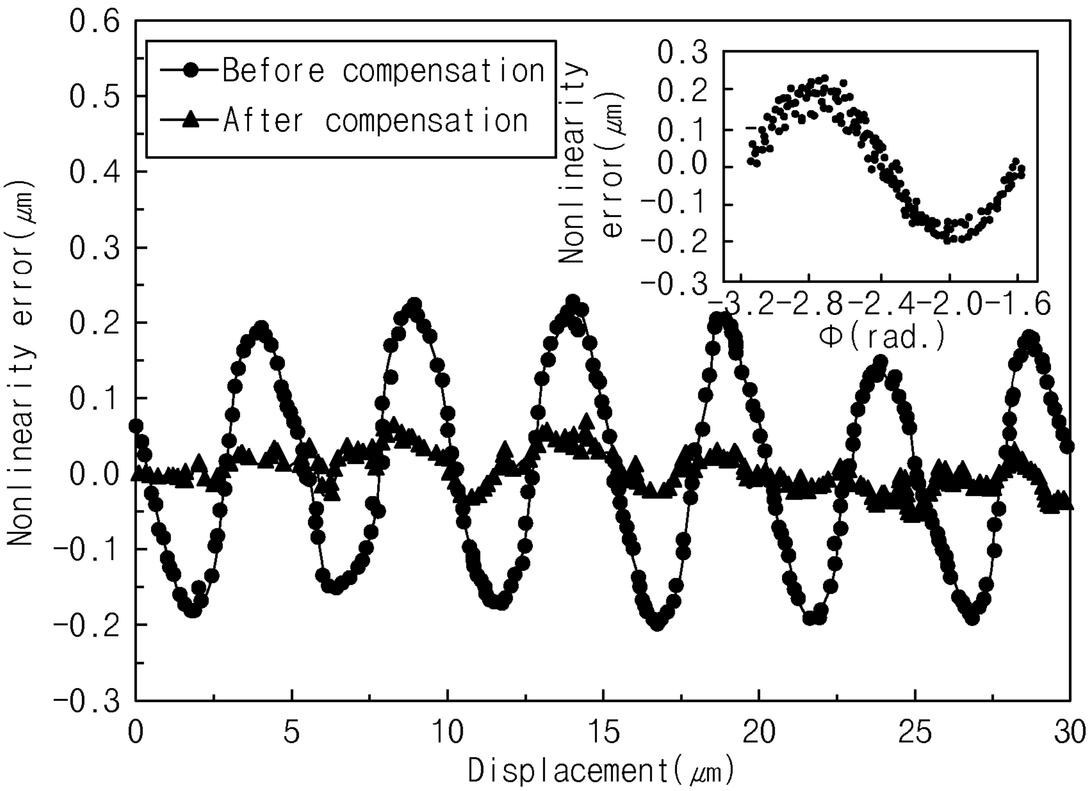
FIG. 21 shows a nonlinear error in a sub-division process before and after error compensation.

FIG. 21 shows a nonlinear error in a sub-division process before and after error compensation. The linear error is drawn as to the phase (ϕ). The nonlinearity error shows a periodic characteristic and looks like a sinusoidal signal having six periods within the pitch of the data cell. This kind of error is caused by the fact that the intensity profile is not a perfect sinusoidal function. This kind of error has high harmonic terms. Especially, the high harmonic term may be a third-order harmonic term.

Although the objective lens unit filters out the high harmonic terms of the intensity profile, some of high harmonic terms still remain and cause a nonlinearity error in the sub-division process.

This periodic nonlinearity error has a sinusoidal shape of the phase (ϕ). Thus, the amplitude of the error may be calibrated by fitting the error value to the sinusoidal function. The nonlinearity error may be reduced to less than ±0.06 μm by using a compensation term expressed as $A_{ne}\times\sin(4\phi+\pi)$.

Figure 22:
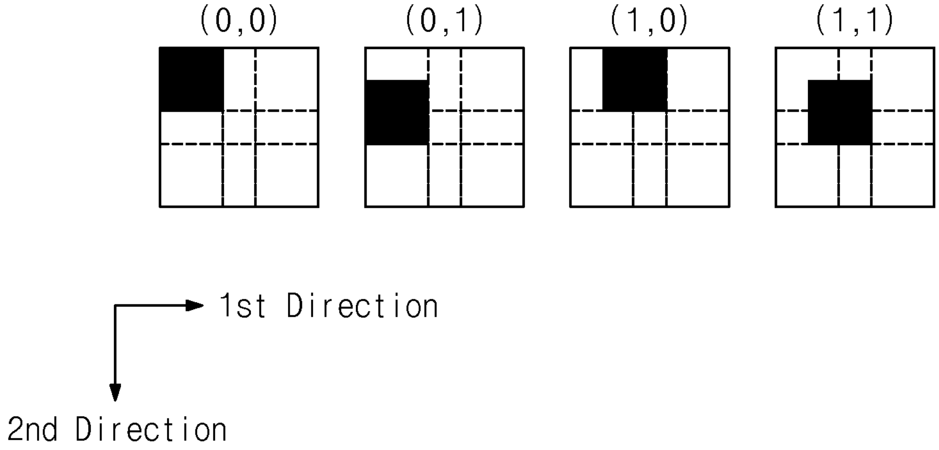
FIG. 22 illustrates a data cell of a two-dimensional binary scale according to an embodiment of the present disclosure.

FIG. 22 illustrates a data cell of a two-dimensional binary scale according to an embodiment of the present disclosure.

Referring to FIG. 22, a two-dimensional data cell representing one bit of a first absolute position binary code of a first direction and one bit of a second absolute position binary code of a second direction perpendicular to the first direction includes a first data section (3/8), a first neutral section (2/8), and a first clock section (3/8) of a relatively fixed position in the first direction, each section including at least one segment and the two-dimensional data cell being subdivided into the segments at equidistant intervals.

The two-dimensional data cell includes a second data section, a second neutral section, and a second clock section of a relatively fixed position in the second direction perpendicular to the first direction, each section including at least one segment and the two-dimensional data cell being subdivided into the segments at equidistant intervals.

The two-dimensional data cell represents a (0,0) state when a mark pattern is formed to fill an intersection area of the first data section and the second data section.

The two-dimensional data cell represents a (1,0) state when it is shifted in the first direction by width of the first neutral area to form the mark pattern.

The two-dimensional data cell represents a (0,1) state when it is shifted in the second direction by width of the second neutral area to form the mark pattern.

The two-dimensional data cell represents a (1,1) state when it is shifted in the second direction by the width of the first neutral area and shifted in the second direction by the width of the second neutral area to form the mark pattern.

Figure 23:
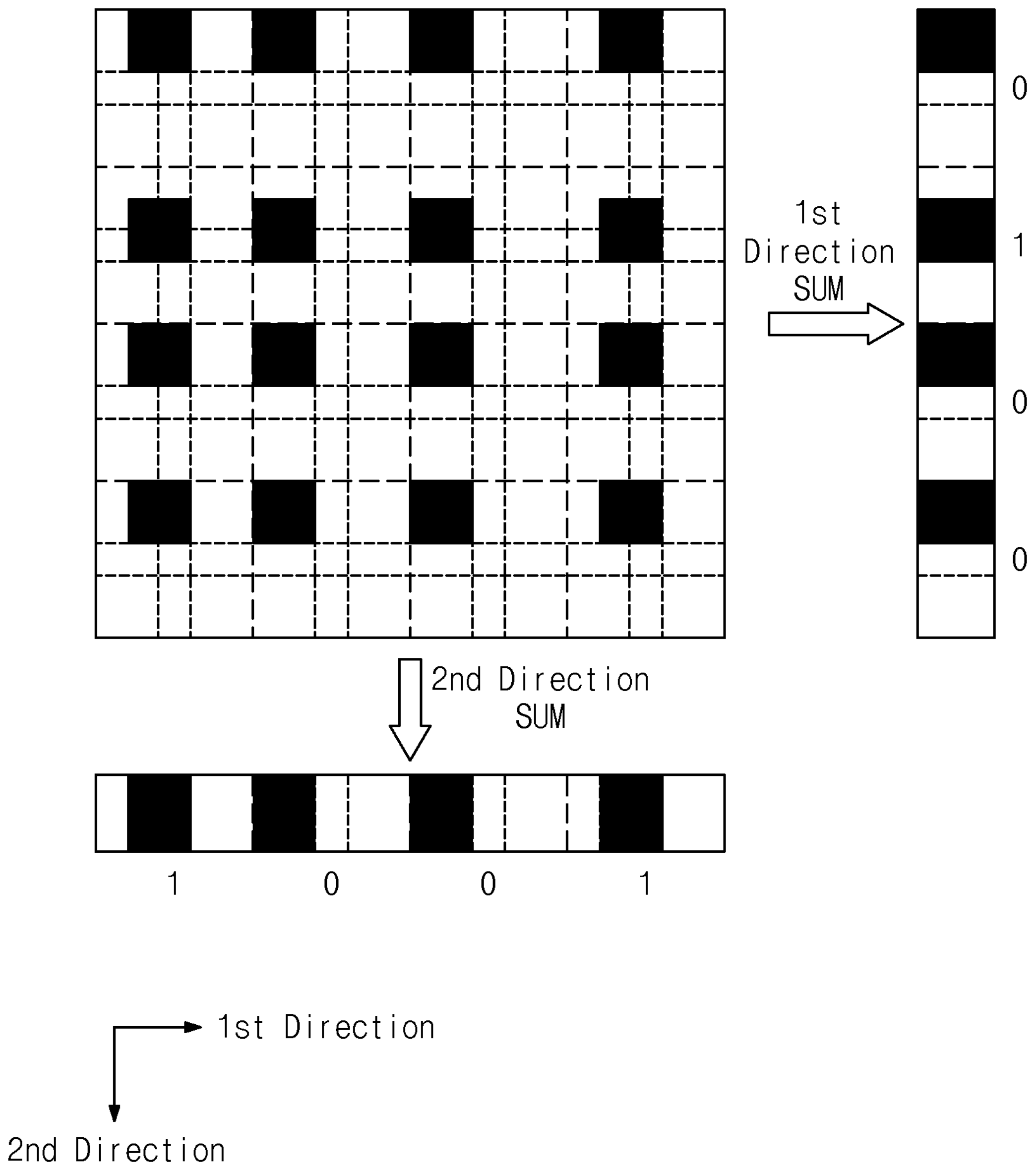
FIG. 23 illustrates a two-dimensional absolute position scale using a data cell of a two-dimensional binary scale according to an embodiment of the present disclosure.

FIG. 23 illustrates a two-dimensional absolute position scale using a data cell of a two-dimensional binary scale according to an embodiment of the present disclosure.

Referring to FIG. 23, two-dimensional data cells may be arranged two-dimensionally to form a two-dimensional absolute position scale and record one-dimensional position information of each direction.

A method for obtaining a first absolute position of a first direction and a method for obtaining a second absolute position of a second direction are the same as described in the first-dimensional binary scale.

Figure 24:
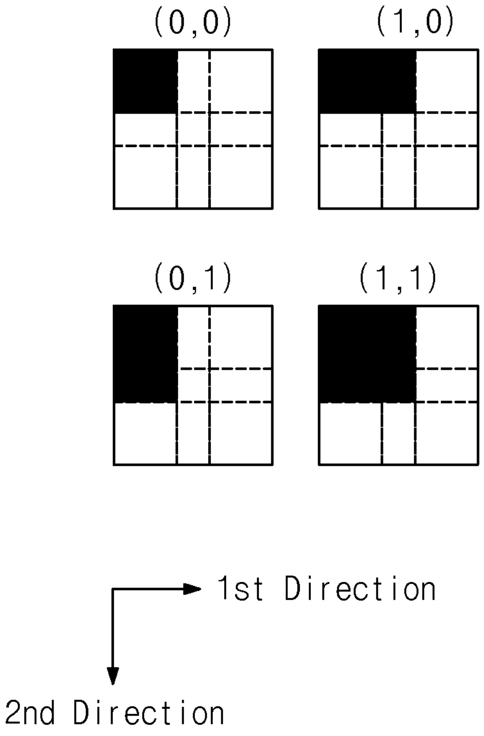
FIG. 24 illustrates a data cell of a two-dimensional binary scale according to an embodiment of the present disclosure.

FIG. 24 illustrates a data cell of a two-dimensional binary scale according to an embodiment of the present disclosure.

Referring to FIG. 24, a two-dimensional data cell representing one bit of a first absolute position binary code of a first direction and one bit of a second absolute position binary code of a second direction perpendicular to the first direction includes a first data section (3/8), a first neutral section (2/8), and a first clock section (3/8) of a relatively fixed portion in the first direction, each section including at least one segment and the two-dimensional data cell being subdivided into the segments at equidistant intervals.

The two-dimensional data cell includes a second data section, a second neutral section, and a second clock section of a relatively fixed position in the second direction perpendicular to the first direction, each section including at least one segment and the two-dimensional data cell being subdivided into the segments at equidistant intervals.

The two-dimensional data cell represents a (0,0) state when a first mark pattern is formed to fill an intersection area of the first data section and the second data section.

The two-dimensional data cell represents a (1,0) state when the first mark pattern is shifted in the first direction by width of the first neutral area to form a second mark pattern.

The two-dimensional data cell represents a (0,1) state when the first mark pattern is shifted in the second direction by width of the second neutral area to form a third mark pattern.

The two-dimensional data cell represents a (1,1) state when the first mark pattern is shifted in the second direction by the width of the first neutral area and shifted in the second direction by the width of the second neutral area to form a fourth mark pattern.

Figure 25:
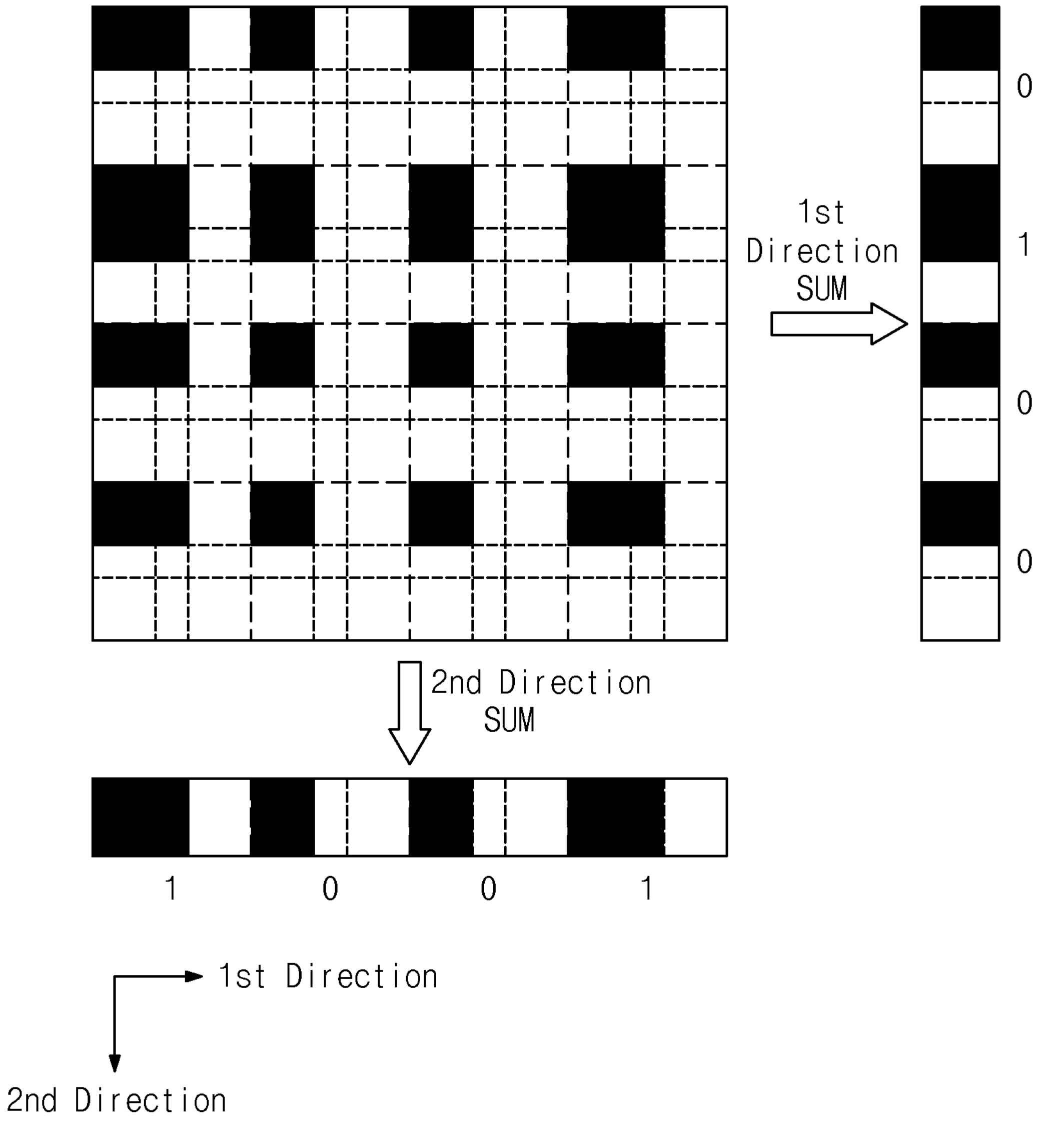
FIG. 25 illustrates a two-dimensional absolute position scale using a data cell of a two-dimensional binary scale according to an embodiment of the present disclosure.

FIG. 25 illustrates a two-dimensional absolute position scale using a data cell of a two-dimensional binary scale according to an embodiment of the present disclosure.

Referring to FIG. 25, two-dimensional data cells may be arranged two-dimensionally to form a two-dimensional absolute position scale and record one-dimensional position information of each direction.

As described so far, an absolute position measurement apparatus according to an embodiment of the present disclosure provides information on an absolute position in a single scale pattern. In addition, the absolute position measurement apparatus may extract a phase of a pattern to provide a finer position. Thus, the absolute position measurement apparatus may provide a finer absolute position.

The present disclosure provides a new absolute position measurement method. According to the absolute position measurement method, a single track binary code is used and an absolute position code is encoded by changing a phase of one binary state representation.

Effective decoding may be performed using structural properties of the single track binary code. Sub-division of the single track binary code is made possible by detecting a state position of the binary state expression used for absolute position encoding. Thus, the absolute position encoding does not interfere with a sub-division process. As a result, any pseudo-random sequence may be used as the absolute position code.

The proposed method according to the present disclosure does not require an additional sensing unit for the sub-division. The proposed method may be implemented with simple configuration and effective data processing.

To verify and estimate the proposed method, an absolute position measurement apparatus was mounted using a binary code scale, a microscopic imaging system, and a CCD camera. From a result compared with a laser interferometer, it could be understand that the absolute position measurement apparatus showed the resolution less than 50 nm and showed a nonlinearity error less than ±60 nm after compensation.

Although the present disclosure has been described in connection with the embodiment of the present disclosure illustrated in the accompanying drawings, it is not limited thereto. It will be apparent to those skilled in the art that various substitutions, modifications and changes may be made without departing from the scope and spirit of the present disclosure.

What is claimed is:

1. An absolute position measuring method comprising:

forming a scale pattern by replacing repeatedly arranged pseudo-random-codes with a sequence of a linear feedback shift register of N stages using a first symbol with first width representing a first state and a second symbol with second width representing a second state, wherein the first symbol is divided into two or more first symbol areas of different structures and the second symbol is divided into two or more second symbol areas of different structures, and there is at least one overlap area in which the first symbol and the second symbol overlap each other to have the same structure; and extracting at least one data relative to a minimum area among the overlap area, the first symbol areas, and the second symbol areas and extracting a sensing signal relative to measurement width equal to or greater than length of a codeword including the N stages.

2. The absolute position measurement method of claim 1, wherein the first width is three or more times greater than width of the minimum area, the first symbol is divided at equidistant intervals as the minimum area, and the second symbol is divided at equidistant intervals as the minimum area, and which further comprises at least one of:

summing the sensing signals measured at intervals of the first width within the range of the measurement width to extract summing signals;

specifying an overlap area of the first symbol and the second symbol using the summing signals;

analyzing the codeword on the basis of the overlap area to extract coarse absolute position information; and extracting a phase using the sensing signal corresponding to the overlap area to extract fine absolute position information.

3. The absolute position measurement method of claim 2, wherein the first symbol is divided into three sections at equidistant intervals as the minimum areas, and the second symbol is divided into three sections at equidistant intervals as the minimum area.

4. The absolute position measurement method of claim 2, wherein the pseudo-random-code is a maximum length sequence.

5. The absolute position measurement method of claim 2, wherein there are two or three sensing signals relative to the overlap area.

6. The absolute position measurement method of claim 2, wherein the overlap area includes two overlap areas spaced apart from each other.

7. The absolute position measurement method of claim 2, wherein the overlap area includes two overlap areas disposed successively.

8. The absolute position measurement method of claim 2, wherein the sensing signal is an optical signal reflected from the scale.

9. The absolute position measurement method of claim 2, wherein the sensing signal is an optical signal passing through the scale.

10. The absolute position measurement method of claim 2, wherein the first width is between several micrometers and several millimeters.

11. A scale for measuring an absolute position, comprising:

a scale pattern formed by replacing repeatedly arranged pseudo-random-codes with a sequence of a linear feedback shift register of N stages using a first symbol with first width representing a first state and a second symbol with second width representing a second state, wherein the first symbol is divided into two or more first symbol areas of different structures, the second symbol is divided into two or more second symbol areas of different structures, and there is at least one overlap area in which the first symbol and the second symbol overlap each other to have the same structure.

12. The scale of claim 11, wherein the first symbol and the second symbol include at least one bar pattern.

13. The scale of claim 11, wherein the pseudo-random-code is a maximum length sequence.

14. The scale of claim 11, wherein the overlap area includes two overlap areas spaced apart from each other.

15. The scale of claim 11, wherein the overlap area includes two overlap areas disposed successively.

16. An absolute position measurement apparatus comprising:

a scale including a scale pattern formed by replacing repeatedly arranged pseudo-random-codes with a sequence of a linear feedback shift register of N stages using a first symbol with first width representing a first state and a second symbol with second width representing a second state, wherein the first symbol is divided into two or more first symbol areas of different structures and the second symbol is divided into two or more second symbol areas of different structures, there is at least one overlap area in which the first symbol and the second symbol overlap each other to have the same structure, and at least one data is extracted relative to a minimum area among the overlap area, the first symbol areas, and the second symbol area;

a sensor array adapted to measure a sensing signal relative to measurement width equal to or greater than length of a codeword including the N stages, wherein the first width is three times greater than width of the minimum area, the first symbol is divided at equidistant intervals as the minimum areas, and the second symbol is divided at equidistant intervals as the minimum areas; and a processing unit configured such that the sensing signals measured at intervals of the first width within the range of the measurement width are summed to provide summing signals.

17. The absolute position measurement apparatus of claim 16, wherein the processing unit specifies the first symbol and the second symbol by using the summing signals, analyzes the codeword on the basis of the overlap area to extract coarse absolute position information, and extracts a phase by using the sensing signal corresponding to the overlap area to extract fine absolute position information.

18. An absolute position measurement method comprising:

providing a binary scale including an absolute position binary code, wherein a data cell representing one bit of the absolute position binary code includes a data section, a neutral section, and a clock section of a relatively fixed position, each of the sections includes at least one segment, and the data cell is sub-divided into the segments at equidistant intervals;

obtaining an image of the binary scale through an optical system and an optical sensor array; and processing the image to calculate an absolute position, wherein a magnification of the optical system is adjusted such that a width of an image corresponding to one segment is an integer multiple of a pixel width of the optical sensor array.

19. The absolute position measurement method of claim 18, wherein the data section is shifted by one segment to represent a binary state in the data cell.

20. The absolute position measurement method of claim 18, wherein processing the image to calculate an absolute position comprises at least one of:

finding a clock pixel most closely aligned with the clock section in a pixel subset corresponding to one data cell width;

assigning an order of the clock pixel to a clock pixel index in the pixel subset corresponding to one data cell width;

circularly shifting the clock pixel index in a direction of reducing the clock pixel index to obtain an absolute code pixel index;

deciding a binary state of a pixel subset using the intensities of absolute code pixels corresponding to the absolute code pixel index in each pixel subset;

converting a binary code of pixel subsets whose binary state is decided into an absolute position code through a lookup table;

finding a data pixel corresponding to a position of the data section with the maximum intensity in each pixel subset;

calculating a relative phase of the data section by using pixel values around the data pixel;

subtracting $-2\pi$ when the relative phase is equal to or greater than zero; and calculating the absolute position by using the absolute position code, the absolute code pixel index, and the relative phase.

21. The absolute position measurement method of claim 18, further comprising:

eliminating a length-dependent error term by using a linear feedback manner; and compensating a nonlinearity error in a sub-division process with a sinusoidal function according to the relative phase.

22. The absolute position measurement method of claim 18, wherein the data cell represents one bit of a first absolute position binary code of a first direction and one bit of a second absolute position binary code of a second direction perpendicular to the first direction.

23. An absolute position measurement apparatus comprising:

a binary scale including an absolute position binary code, wherein a data cell representing one bit of the absolute position binary code includes a data section, a neutral section, and a clock section of a relatively fixed position, each of the sections includes at least one segment, and the data cell is sub-divided into the segments at equidistant intervals;

a light source adapted to irradiate light to the binary scale;

an optical system adapted to focus light passing through the binary scale or reflected from the binary scale; and an optical sensor array adapted to sense an image of the binary scale, wherein a magnification of the optical system is adjustable such that a width of an image corresponding to one segment is an integer multiple of a pixel width of the optical sensor array.

24. The absolute position measurement apparatus of claim 23, wherein the optical system comprises:

an objective lens unit adapted to irradiate output light of the light source to the binary scale; and an image lens unit adapted to focus light reflected from the binary scale and passing through the objective lens unit on the optical sensor array.

25. The absolute position measurement apparatus of claim 24, further comprising:

a collimator lens adapted to convert the light of the light source into parallel light; and a beam splitter adapted to change and provide an optical path of the parallel light to the objective lens unit and provide light provided from the objective lens unit to the image lens unit.

26. A binary scale comprising an absolute position binary code, wherein a data cell representing one bit of the absolute position binary code includes a data section, a neutral section, and a clock section of a relatively fixed position, each of the sections includes at least one segment, and the data cell is sub-divided into the segments at equidistant intervals.

27. The binary scale of claim 26, wherein the data section is translated to represent a binary state in the data cell.

28. A two-dimensional binary scale wherein a two-dimensional data cell representing one bit of a first absolute position binary code of a first direction and one bit of a second absolute position binary code of a second direction perpendicular to the first direction includes a first data section, a first neutral section, and a first clock section of a relatively fixed position in the first direction, each section including at least one segment and the two-dimensional data cell being sub-divided into the segments at equidistant intervals, wherein the two-dimensional data cell includes a second data section, a second neutral section, and a second clock section of a relatively fixed position in the second direction perpendicular to the first direction, each section including at least one segment and the two-dimensional data cell being sub-divided into the segments at equidistant intervals, wherein the two-dimensional data cell represents a (0,0) state when a mark pattern is formed to fill an intersection area of the first data section and the second data section, wherein the two-dimensional data cell represents a (1,0) state when it is shifted in the first direction by width of the first neutral area to form the mark pattern, wherein the two-dimensional data cell represents a (0,1) state when it is shifted in the second direction by width of the second neutral area to form the mark pattern, and wherein the two-dimensional data cell represents a (1,1) state when it is shifted in the second direction by the width of the first neutral area and shifted in the second direction by the width of the second neutral area to form the mark pattern.

29. A two-dimensional binary scale wherein a two-dimensional data cell representing one bit of a first absolute position binary code of a first direction and one bit of a second absolute position binary code of a second direction perpendicular to the first direction includes a first data section, a first neutral section, and a first clock section of a relatively fixed position in the first direction, each section including at least one segment and the two-dimensional data cell being sub-divided into the segments at equidistant intervals, wherein the two-dimensional data cell includes a second data section, a second neutral section, and a second clock section of a relatively fixed position in the second direction perpendicular to the first direction, each section including at least one segment and the two-dimensional data cell being sub-divided into the segments at equidistant intervals, wherein the two-dimensional data cell represents a (0,0) state when a first mark pattern is formed to fill an intersection area of the first data section and the second data section, wherein the two-dimensional data cell represents a (1,0) state when the first mark pattern extends in the first direction by width of the first neutral area to form a second mark pattern, wherein the two-dimensional data cell represents a (0,1) state when the first mark pattern extends in the second direction by width of the second neutral area to form a third mark pattern, and wherein the two-dimensional data cell represents a (1,1) state when the first mark pattern extends in the first direction by the width of the first neutral area and extends in the second direction by the width of the second neutral area to form a fourth mark pattern.

* * * * *